Nov. 16, 1937.                    C. M. YODER                    2,098,989
            APPARATUS FOR AND PROCESS OF MAKING HOLLOW BODIES
                        Filed July 24, 1934           18 Sheets-Sheet 1

INVENTOR
Carl M. Yoder
BY Geo. B. Pitts
ATTORNEY

Nov. 16, 1937.　　　　C. M. YODER　　　　2,098,989
APPARATUS FOR AND PROCESS OF MAKING HOLLOW BODIES
Filed July 24, 1934　　　18 Sheets-Sheet 6

BY　Carl M. Yoder
　　Geo. B. Pitts
　　ATTORNEY

Nov. 16, 1937.   C. M. YODER   2,098,989
APPARATUS FOR AND PROCESS OF MAKING HOLLOW BODIES
Filed July 24, 1934   18 Sheets-Sheet 7

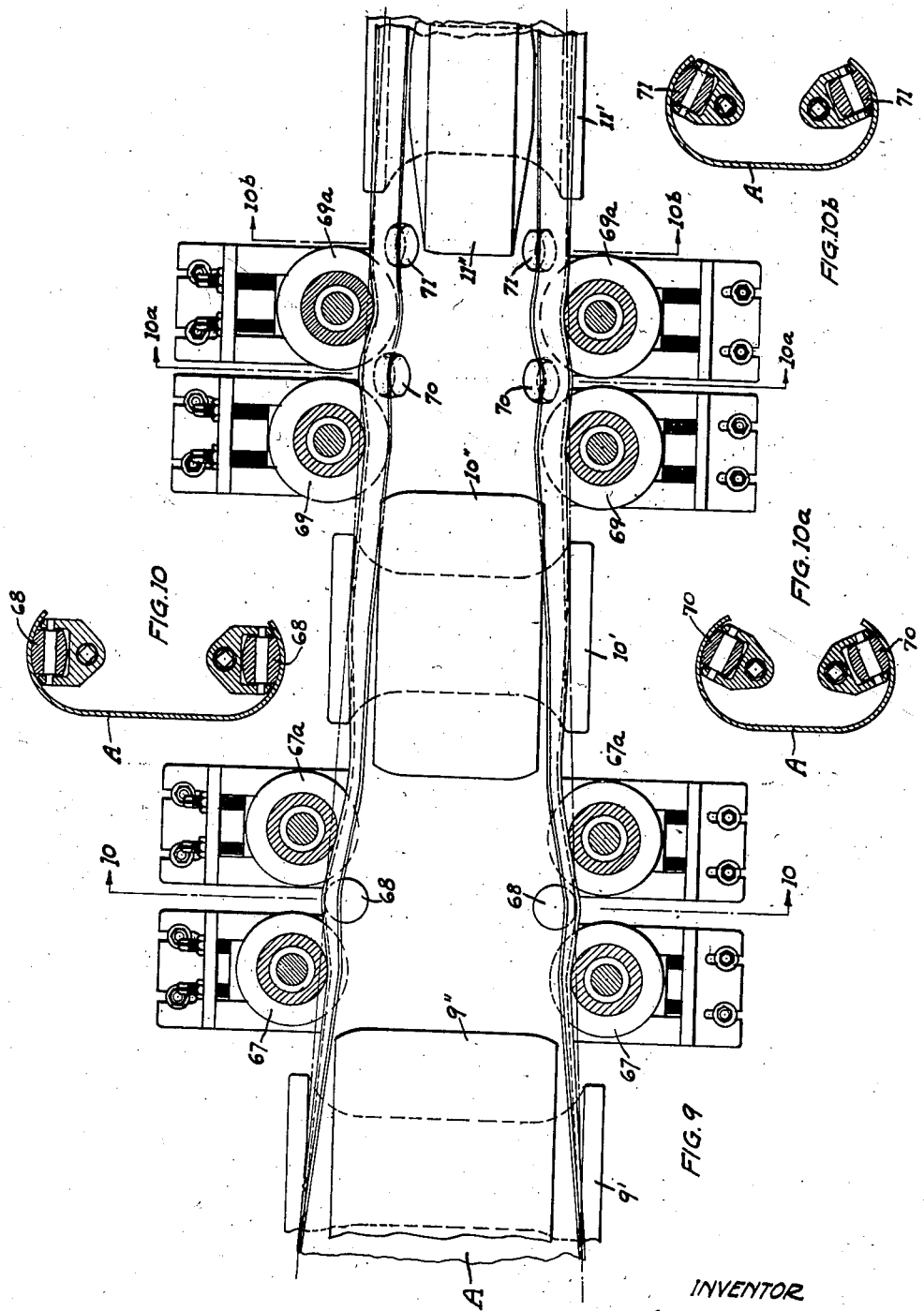

Nov. 16, 1937.    C. M. YODER    2,098,989
APPARATUS FOR AND PROCESS OF MAKING HOLLOW BODIES
Filed July 24, 1934    18 Sheets-Sheet 10
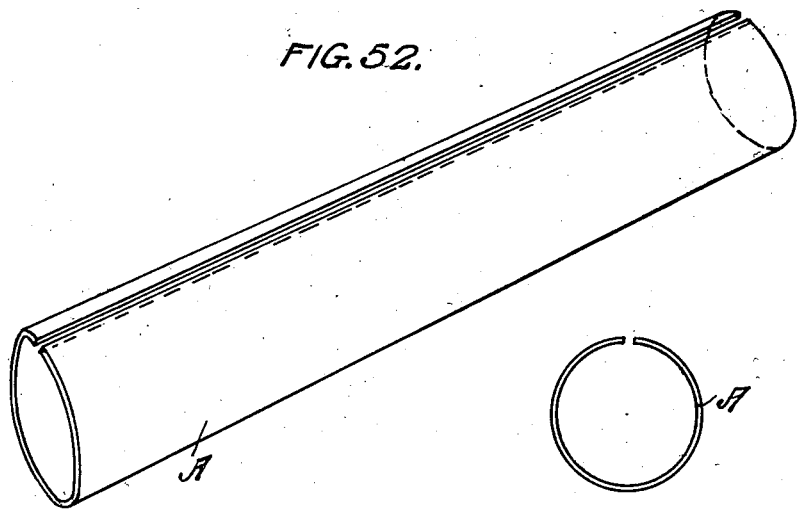
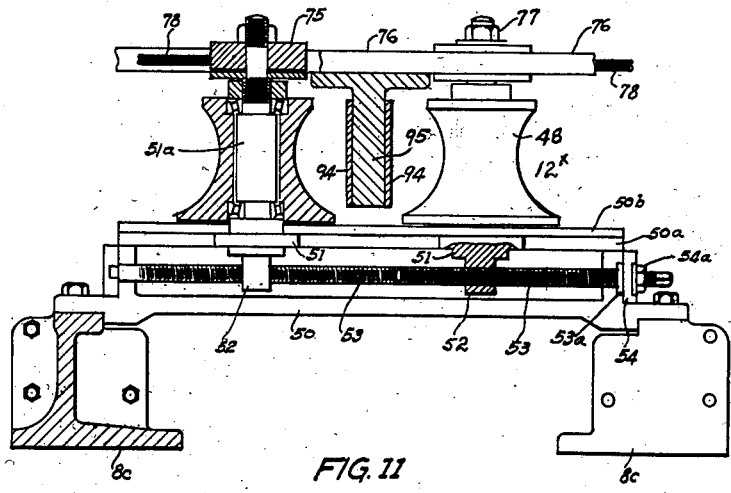
INVENTOR
Carl M. Yoder
BY Geo. B Pitts
ATTORNEY

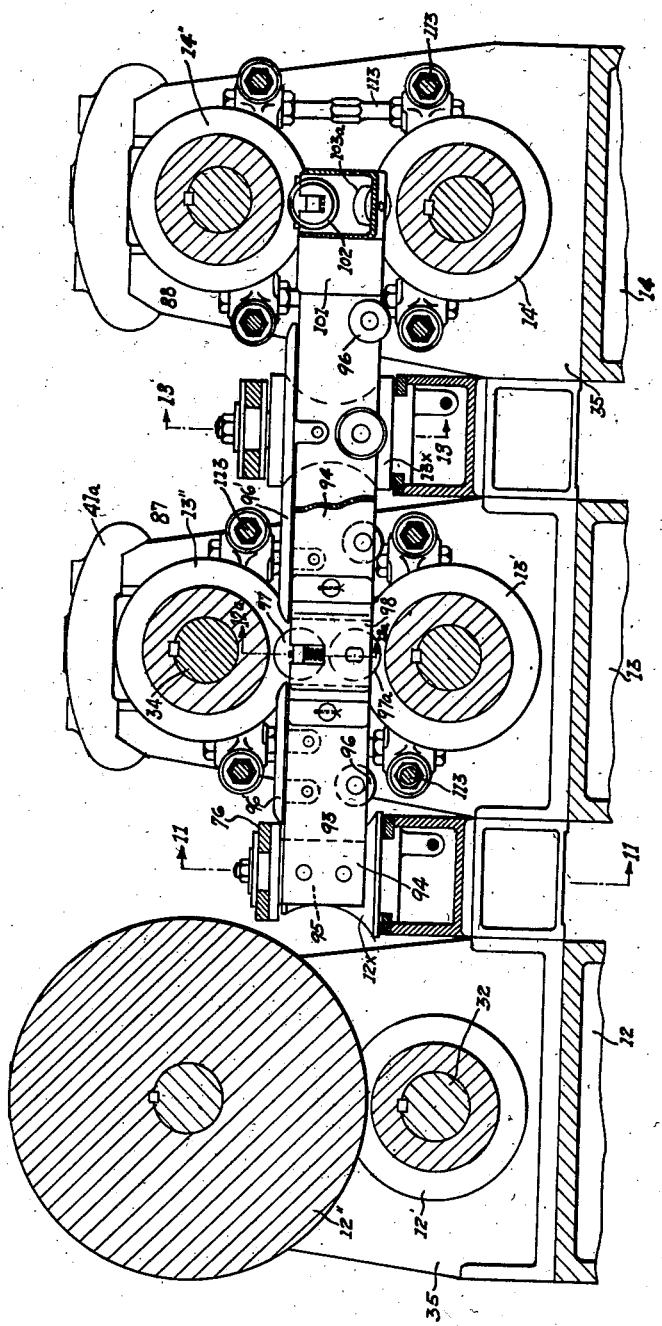

Nov. 16, 1937.   C. M. YODER   2,098,989
APPARATUS FOR AND PROCESS OF MAKING HOLLOW BODIES
Filed July 24, 1934   18 Sheets-Sheet 12
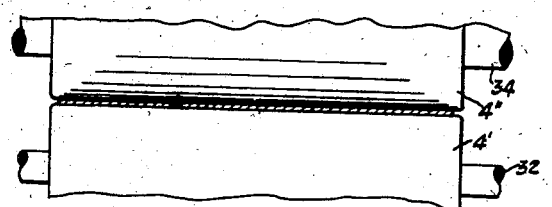
FIG. 26
FIG. 50
FIG. 51
FIG. 27
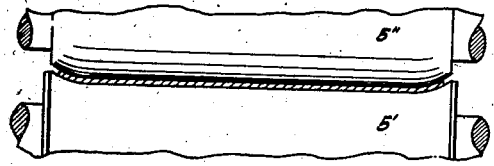
FIG. 28
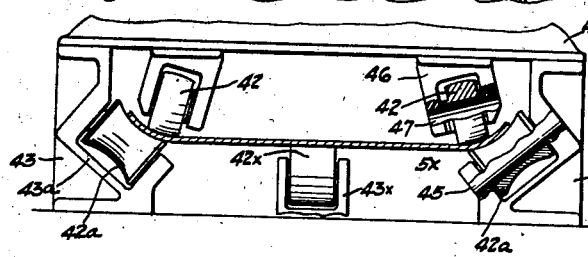
FIG. 29
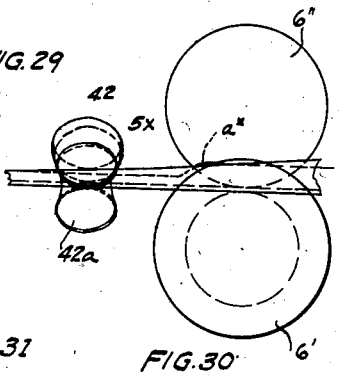
FIG. 30
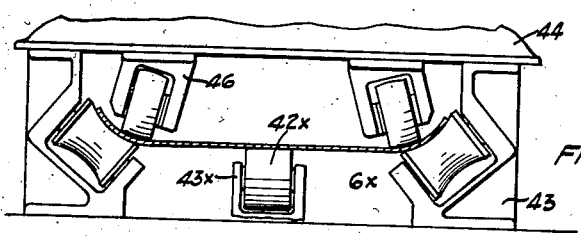
FIG. 31
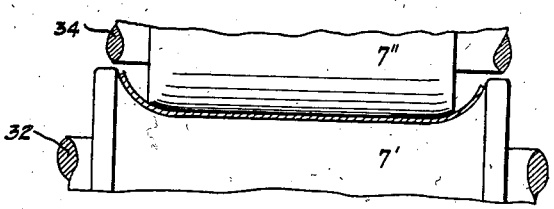
FIG. 32
FIG. 33
INVENTOR
Carl M. Yoder
BY
Geo. B. Pitts
ATTORNEY Nov. 16, 1937.   C. M. YODER   2,098,989
APPARATUS FOR AND PROCESS OF MAKING HOLLOW BODIES
Filed July 24, 1934   18 Sheets-Sheet 13

INVENTOR
Carl M. Yoder
BY
Geo. B Sitts
ATTORNEY

Nov. 16, 1937.    C. M. YODER    2,098,989
APPARATUS FOR AND PROCESS OF MAKING HOLLOW BODIES
Filed July 24, 1934    18 Sheets-Sheet 14

INVENTOR
Carl M. Yoder
BY
Geo. B. Pitts
ATTORNEY

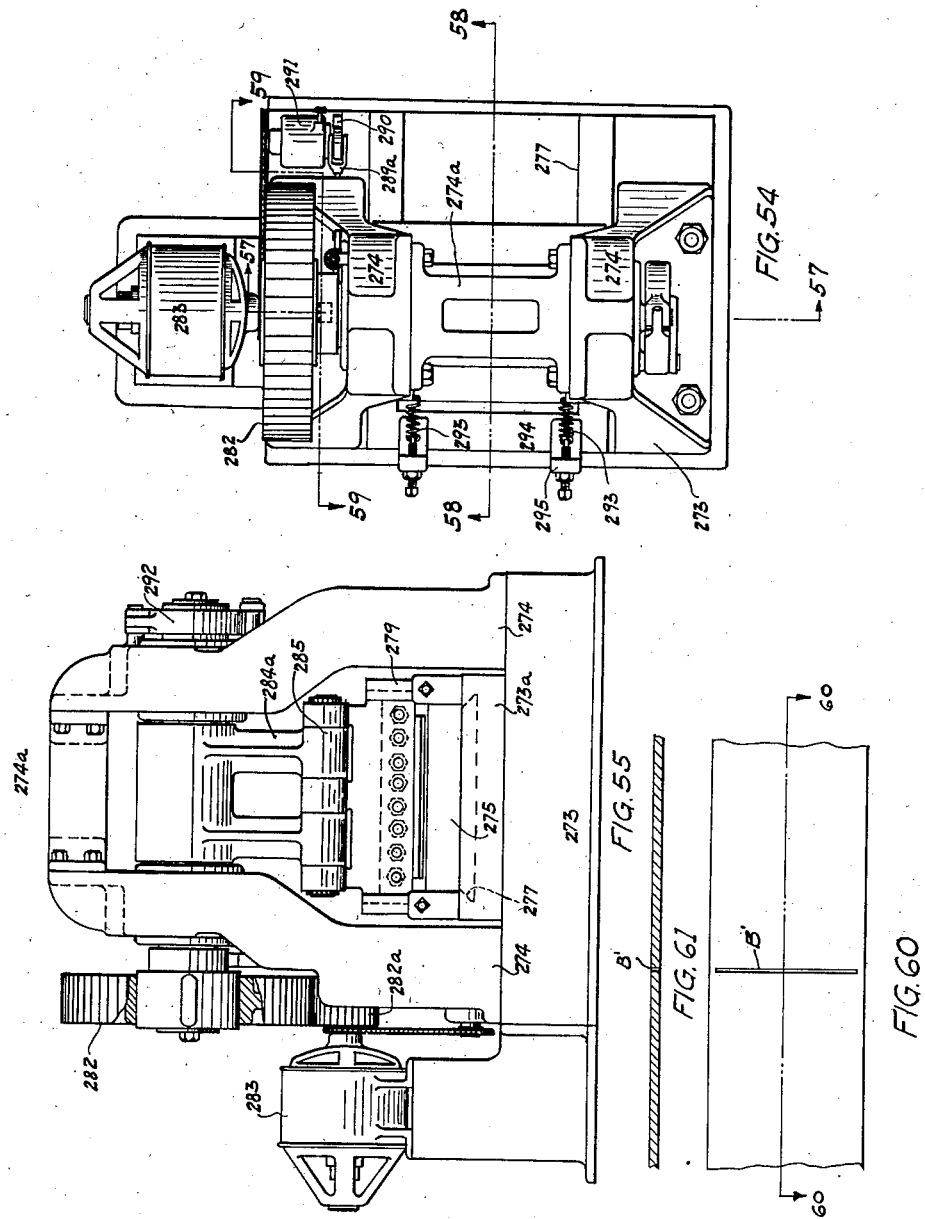

Nov. 16, 1937.  C. M. YODER  2,098,989
APPARATUS FOR AND PROCESS OF MAKING HOLLOW BODIES
Filed July 24, 1934  18 Sheets-Sheet 16
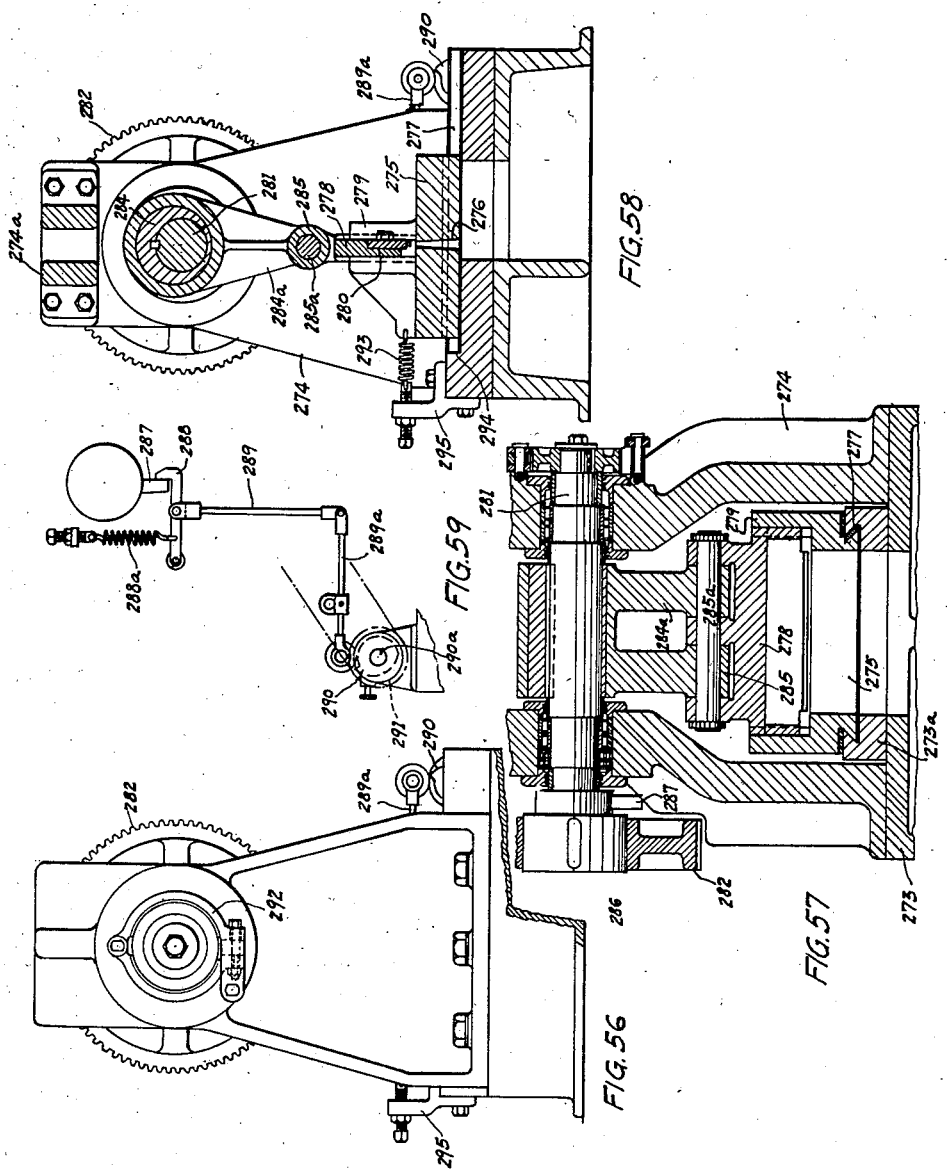
INVENTOR
Carl M. Yoder
BY Geo. B Pitts
ATTORNEY

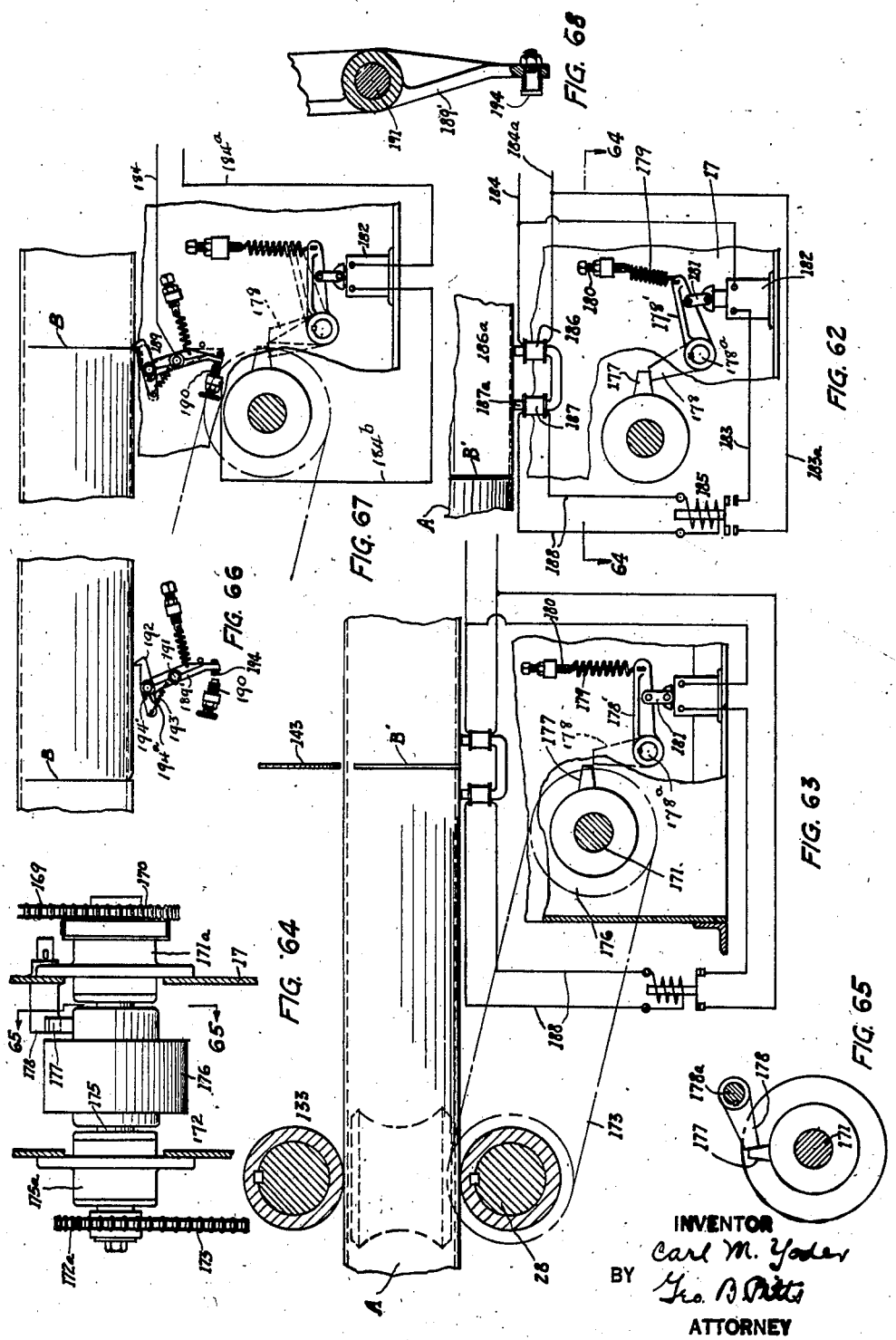

Nov. 16, 1937.  C. M. YODER  2,098,989
APPARATUS FOR AND PROCESS OF MAKING HOLLOW BODIES
Filed July 24, 1934    18 Sheets-Sheet 18
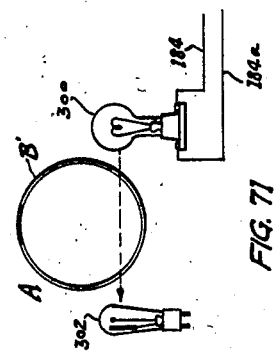
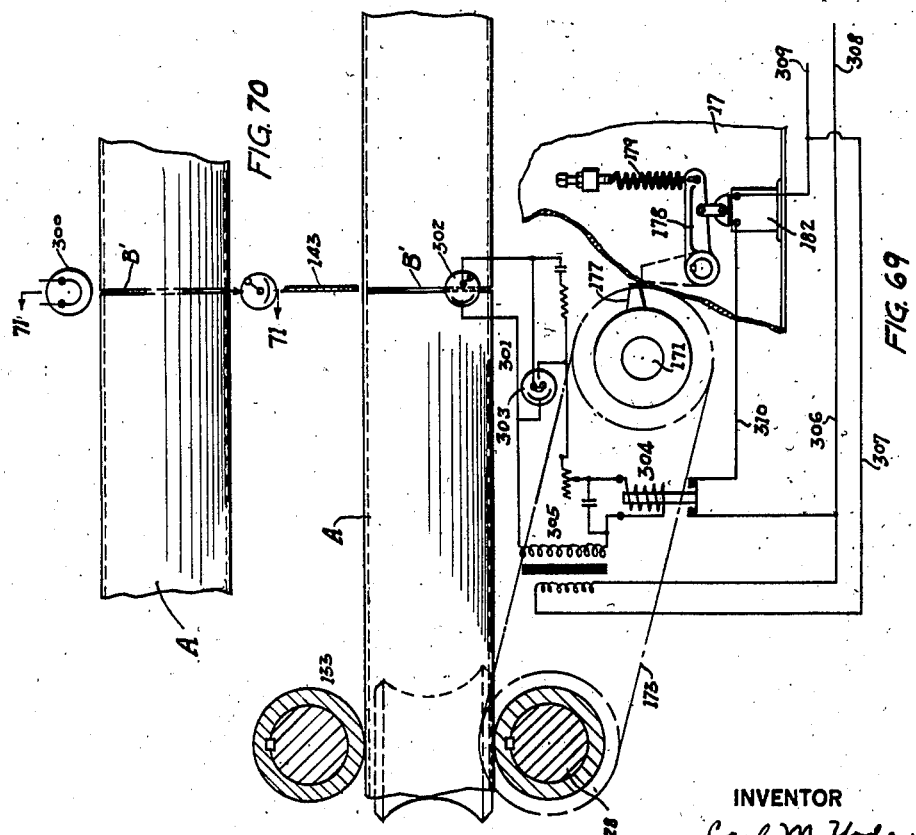
INVENTOR
Carl M. Yoder
BY Geo. A Titts
ATTORNEY Patented Nov. 16, 1937

2,098,989

UNITED STATES PATENT OFFICE 2,098,989

APPARATUS FOR AND PROCESS OF MAKING HOLLOW BODIES

Carl Minter Yoder, Lakewood, Ohio, assignor to The Yoder Company, Cleveland, Ohio, a corporation of Ohio Application July 24, 1934, Serial No. 736,628. In France April 23, 1934, and in Great Britain April 23, 1934

42 Claims. (Cl. 113—33)

This invention relates to apparatus for and method of forming sheet material, including sheet metal and sheet steel ordinarily known as skelp, into hollow bodies for various uses, including containers for liquid and gas, and conduits and pipes for storing and conveying gas, oils and other fluids. One important object of the invention is to provide an improved apparatus for making hollow bodies of various sizes including relatively large hollow bodies of maximum length and capacity expeditiously and economically, these results being attained by reason of the fact that contiguous portions of the material, from its opposite side edges inwardly, are successively curved, guided and controlled to shape the material into final form.

Another object of the invention is to provide improved apparatus and method for continuously supplying sheet material, continuously shaping the material into hollow form, continuously welding the seam of the form and cutting the formed body into predetermined lengths, or sections, whereby the latter are produced, ready for use, speedily, without intermediate handling, manually or otherwise, economically and without waste of material. In this form of apparatus and method, when it is desired to weld the seams by a separate apparatus, material of indefinite length may be continuously fed to the apparatus and formed into hollow bodies and cut into predetermined lengths ready for welding or material of predetermined lengths may be fed to the apparatus and formed into hollow bodies.

Another object of the invention is to provide an improved apparatus and method for forming hollow bodies having a predetermined diameter and length and adapted to operate upon material irrespective of the degree of resiliency which may be characteristically inherent therein.

Other objects of the invention will be apparent to those skilled in the art to which my invention relates from the following description taken in connection with the accompanying drawings, wherein Figs. 1, 1a, 1b and 1c together illustrate a side elevation of an apparatus embodying my invention and capable of carrying out my improved process.

Figs. 2, 2a, 2b and 2c together illustrate a plan view of the apparatus.

Fig. 5a is a fragmentary section on the line 5a—5a of Fig. 4.

Fig. 6 is a section on the line 6—6 of Figs. 2 and 6a.

Fig. 6a is a section on the line 6a—6a of Fig. 6.

Fig. 7 is a fragmentary view on the line 7—7 of Fig. 2a.

Fig. 7a is a section on the line 7a—7a of Figs. 1a and 2a.

Fig. 8 is a section on the line 8—8 of Figs. 1a and 2a.

Fig. 9 is a fragmentary section on the line 9—9 of Figs. 1a and 1b, enlarged.

Figs. 10, 10a and 10b are fragmentary sections on the lines 10—10, 10a—10a and 10b—10b, respectively, of Fig. 9.

Fig. 11 is a fragmentary section substantially on the line 11—11 of Figs. 1b and 12.

Fig. 12 is a section on the line 12—12 of Fig. 2b.

Fig. 12a is a fragmentary section on the line 12a—12a of Fig. 12, enlarged.

Fig. 13 is a fragmentary section on the line 13—13 of Figs. 1b and 12.

Figure 42:
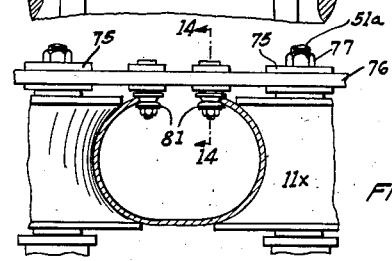
Figure 43:
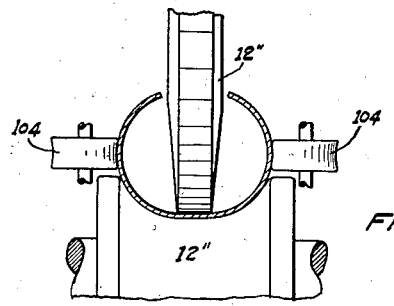

Fig. 14 is a fragmentary section on the line 14—14 of Fig. 42.

Fig. 15 is a section on the line 15—15 of Fig. 1b.

Fig. 16 is a section on the line 16—16 of Fig. 15.

Fig. 16a is a fragmentary section on the line 16a—16a of Fig. 15, enlarged.

Figure 1:
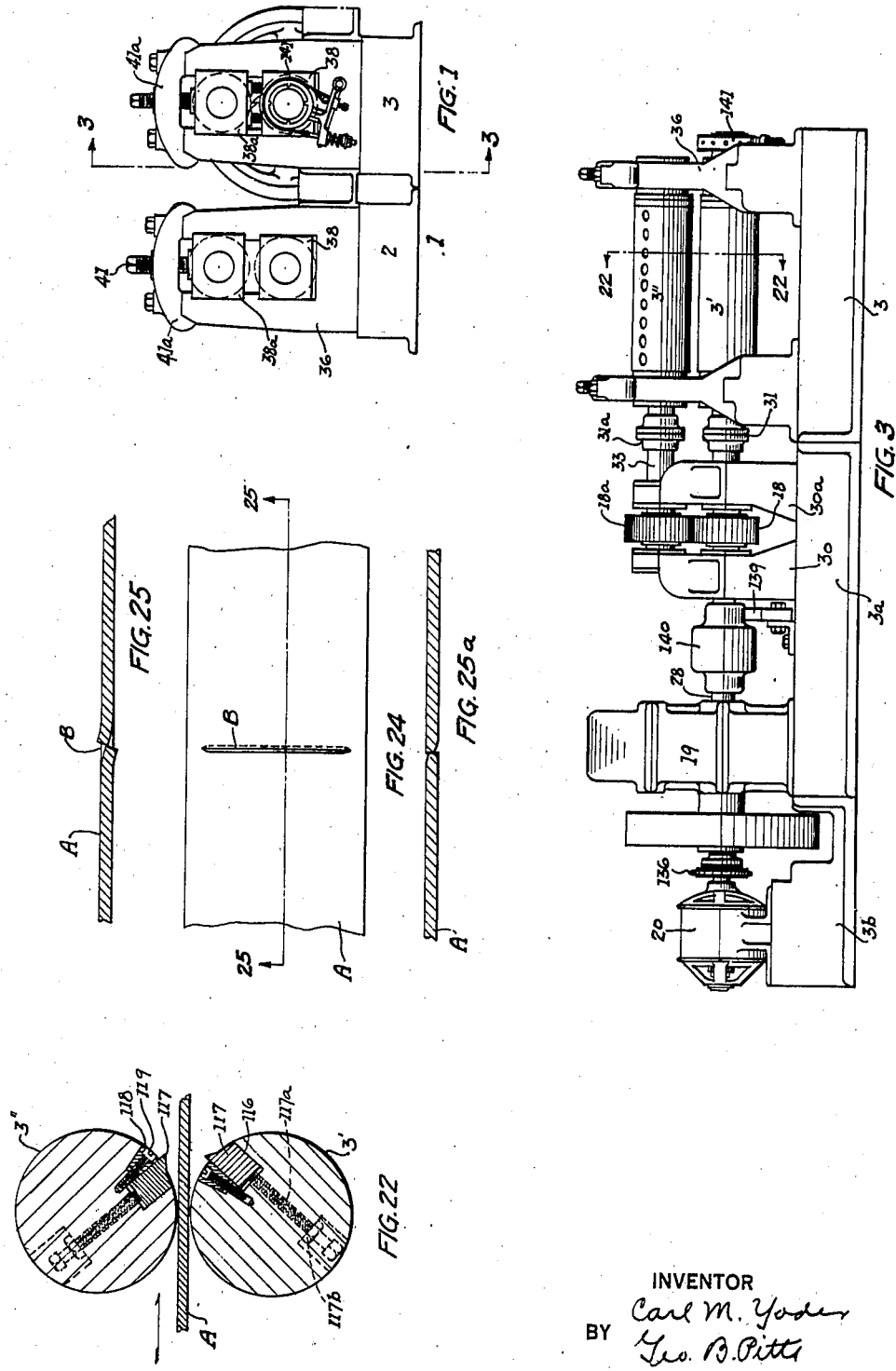
Figure 2:
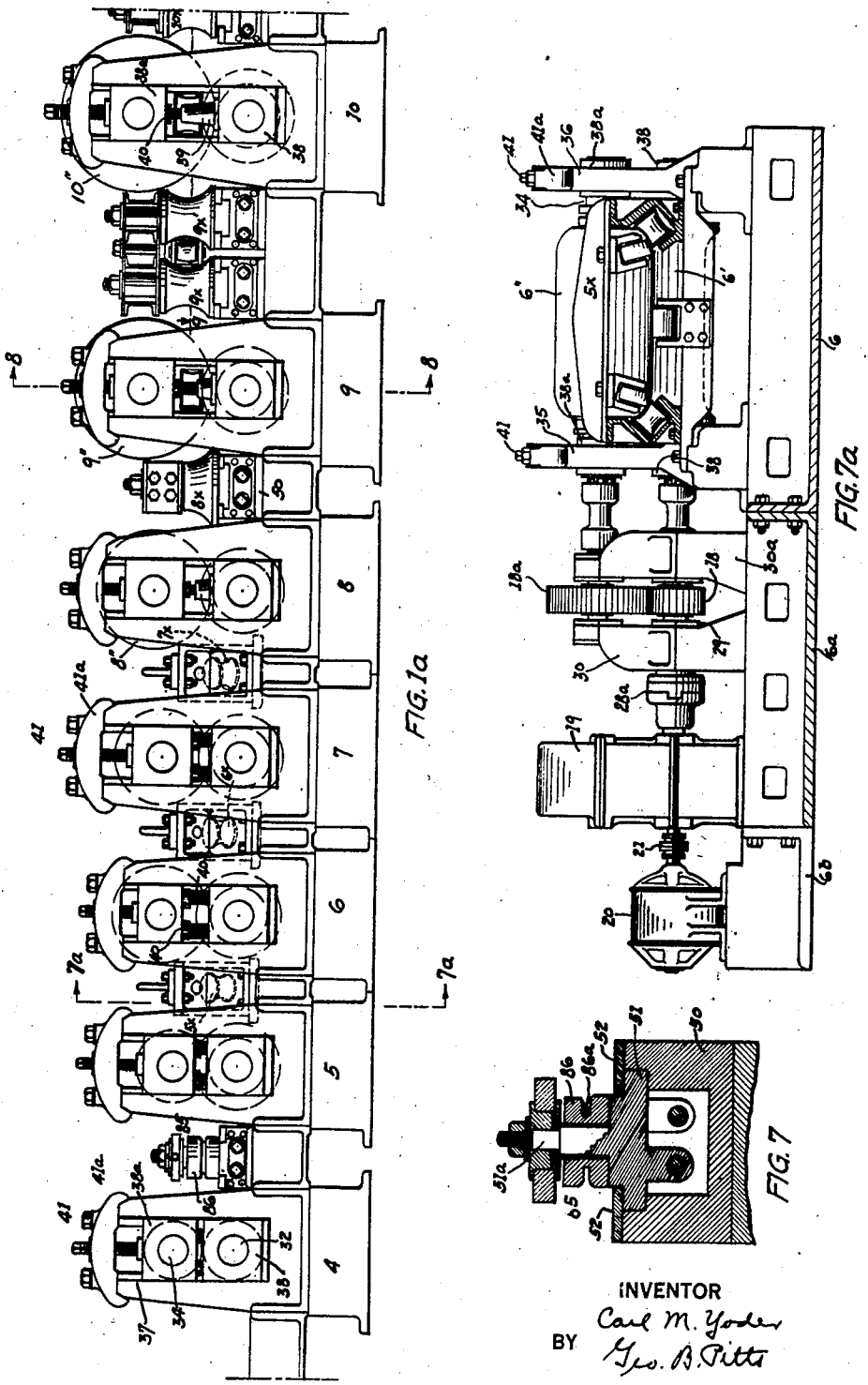
Fig. 2d is a fragmentary section on the line 2d—2d of Fig. 2.

Fig. 17 is a fragmentary plan view of parts shown in Figs. 1 and 2.

Fig. 18 is a section on the line 18—18 of Fig. 17.

Fig. 19 is a section on the line 19—19 of Fig. 18.

Fig. 20 is an end view of a filler.

Fig. 21 is a plan view of a filler.

Figure 3:
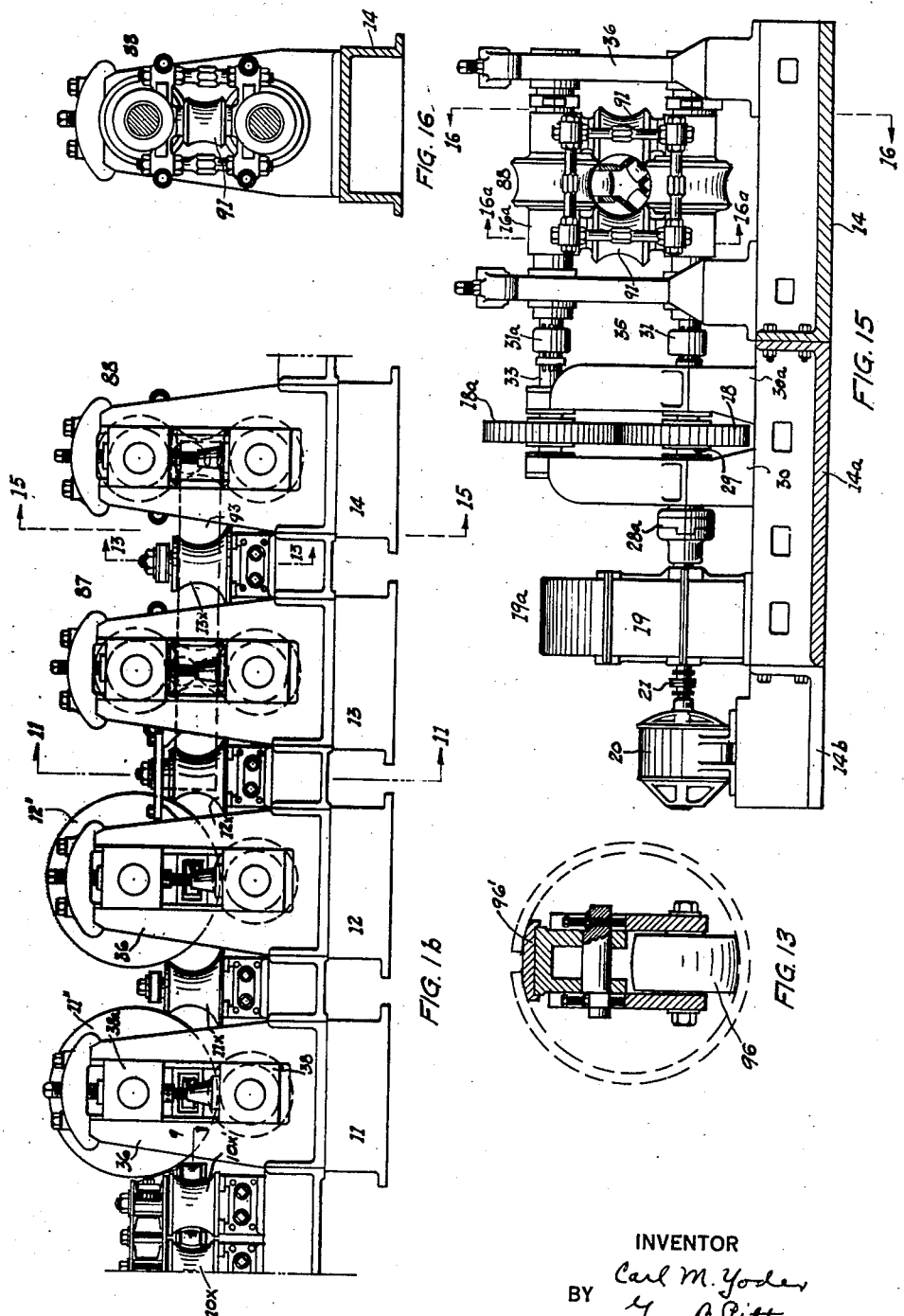
Fig. 3 is a section on the line 3—3 of Fig. 1.
Figure 4:
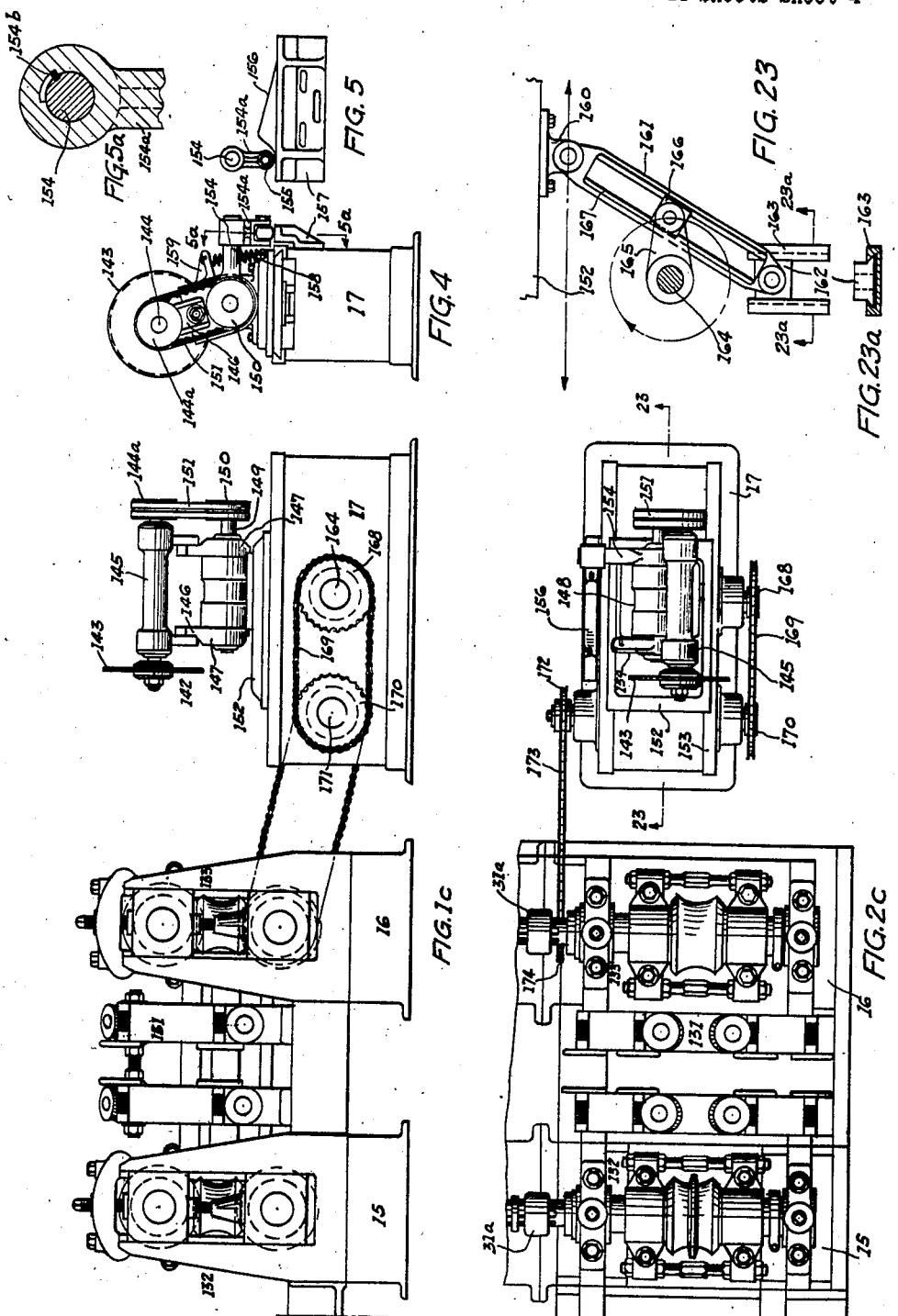
Fig. 4 is an end elevation looking towards the left of Fig. 1c.

Fig. 22 is a fragmentary section on the line 22—22 of Fig. 3.

Fig. 23 is a detail view showing the reciprocating mechanism for the saw support; being a fragmentary section on line 23—23 of Fig. 2c.

Fig. 23a is a section on the line 23a—23a of Fig. 23.

Fig. 24 is a plan view of a portion of the sheet stock showing the up-setting thereof transversely throughout its central portion after passing through the up-setting rolls; this being the first step of my complete process.

Fig. 25 is a section on the line 25—25 of Fig. 24.

Fig. 25a is a section similar to Fig. 25, but showing the up-set portions rolled down after passing the second set of feeding rolls.

Figs. 26 to 47, inclusive, show by fragmentary view of the apparatus, the remaining successive steps of my process in shaping the stock or skelp from a web A into final shape.

Figure 36A:
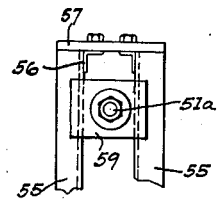
Figure 36:
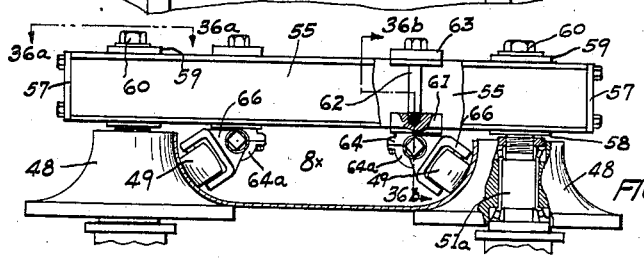
Figure 36B:
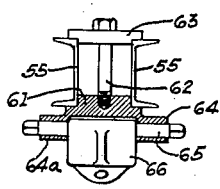
Figure 37:
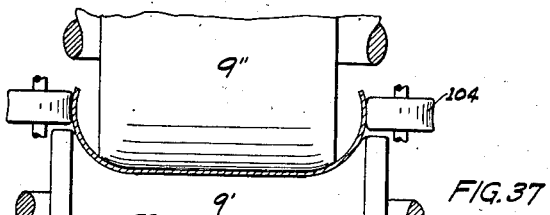

Figs. 36a and 36b are fragmentary views on the lines 36a—36a and 36b—36b, respectively, of Fig. 36.

Fig. 48 shows a fragmentary portion of the shaped material after passing the welding apparatus.

Fig. 49 is a view similar to Fig. 48, but showing the final cutting step, whereby the shaped material is cut into predetermined lengths and ready for installation.

Fig. 50 is a fragmentary perspective view showing the marginal portion of a sheet stock as it comes from the mill after passing the shearing devices.

Fig. 51 is a fragmentary perspective view showing the marginal portion of the stock A after it has passed the edge shaping or conditioning means.

Fig. 52 is a perspective view of a shaped body or member formed from a blank of predetermined length.

Fig. 53 is an end of the member shown in Fig. 52.

Fig. 54 is a plan view of a machine capable of slotting the material to effect a preliminary cutting thereof on transverse lines.

Fig. 55 is an elevation looking toward the right of Fig. 54, parts being broken away.

Fig. 56 is an end elevation, parts being broken away.

Figs. 57 and 58 are sections on the lines 57—57 and 58—58, respectively, of Fig. 54.

Fig. 59 is a fragmentary section on the line 59—59 of Fig. 54.

Fig. 60 is a plan view of a portion of the material showing a slot stamped therein.

Fig. 61 is a section on the line 60—60 of Fig. 59.

Fig. 62 is a fragmentary view, partly diagrammatic, showing one form of electrical means for controlling the operation of the final severing mechanism.

Fig. 63 is a view similar to Fig. 61, but showing the position of the parts in operated position.

Fig. 64 is a section on the line 64—64 of Fig. 62.

Fig. 65 is a section on the line 65—65 of Fig. 64.

Fig. 66 is a fragmentary view showing a form of mechanical means for controlling the final severing means.

Fig. 67 is a view similar to Fig. 66 and additional parts of the controlling means, in operated position.

Fig. 68 is a fragmentary view of a portion of the pawl, enlarged.

Fig. 69 is a view, partly diagrammatic, showing another form of electrical means, employing a photo-electric cell, for controlling the final severing mechanism.

Fig. 70 is a plan view of parts shown in Fig. 69.

Fig. 71 is a section on the line 71—71 of Fig. 70.

The apparatuses and methods herein illustrated may be used for shaping various kinds of sheet material, including plate steel or sheet metal stock of varying thicknesses and of any desired width and length, for example, skelp of indefinite length or skelp which has first been cut into sections or blanks having a predetermined width and length. The apparatus herein disclosed is constructed to produce from ½ inch steel plate hollow cylindrical bodies of any desired length (for example 40 to 50 feet) and twenty inches in diameter. By the substitution of different sized rolls and parts, and/or omission of unnecessary sets of rolls, the apparatus may be adapted to shape material of different thicknesses into cylindrical bodies of larger and smaller diameters when desired.

In the apparatus and process herein illustrated I provide (a) means for conditioning the longitudinal side edges of the material, (b) a plurality of main sets of bending or shaping rolls constituting passes for the material and arranged to first bend or curve lateral portions or increments of the material progressively inwardly, then bend or curve the central portion of the material and finally size the shaped material, certain rolls of each set being preferably driven, (c) intermediate sets or groups of rolls, constituting separate passes, co-operative with the main sets of rolls for re-shaping, guiding and working the material and (d) certain other parts and mechanisms hereinafter referred to.

I also provide mechanism for slotting, up-setting or cutting a portion of the material on transverse lines at points spaced longitudinally of the material equal to the predetermined length of the bodies to be formed, and, following the shaping of the material and welding of the longitudinal seam, I sever the remaining portions of the material transversely on lines coincident with the previous slotting, up-setting or cutting, whereby the shaped material is cut into predetermined lengths. These operations are coordinated with the feeding, shaping and welding of the material, so that the shaping and welding is carried on continuously and the bodies are successively completed.

My process is carried out, with the herein disclosed arrangement of cutting mechanisms and passes in the following manner: the material is first cut or otherwise severed transversely along its intermediate portion leaving its opposite marginal portions integral to provide continuous walls for pre-heating and welding by the welding apparatus; next, the side edges of the material are conditioned ready for welding; next, the outer lateral portions of the material are simultaneously curved on longitudinal lines on a radius smaller than the predetermined radius of the completed body to bend them beyond the elastic limit of the material; next, these curved portions are simultaneously re-shaped to the predetermined radius of the completed body and the adjacent inward lateral portions of the material are simultaneously curved about approximately the same radius preparatory to the curving thereof by the succeeding pass to the smaller radius, these steps being carried out progressively on adjacent inward portions of the material toward its central portion, which is finally curved on the predetermined radius, thereby shaping the material into cylindrical form with its longitudinal side edges in opposed, slightly spaced relation; intermediate the steps of curving the outermost lateral portions of the material and the central portion thereof, such lateral curved portions are subjected to supplemental intermediate passes which (a) bend them inwardly and outwardly on transverse lines beyond the elastic limit of the material to remove from such portions all resiliency of the metal and (b) condition or work the marginal portions of the material to prevent uneven stretching and wrinkling thereof. As a result of these steps, the shaped material is delivered to the welding apparatus with excessive internal strains removed or eliminated. Next, the shaped material is welded along its seam edges and finally the integral portions of the material and welded seam are transversely cut on lines co-incident with the preliminary cutting.

Figure 6:
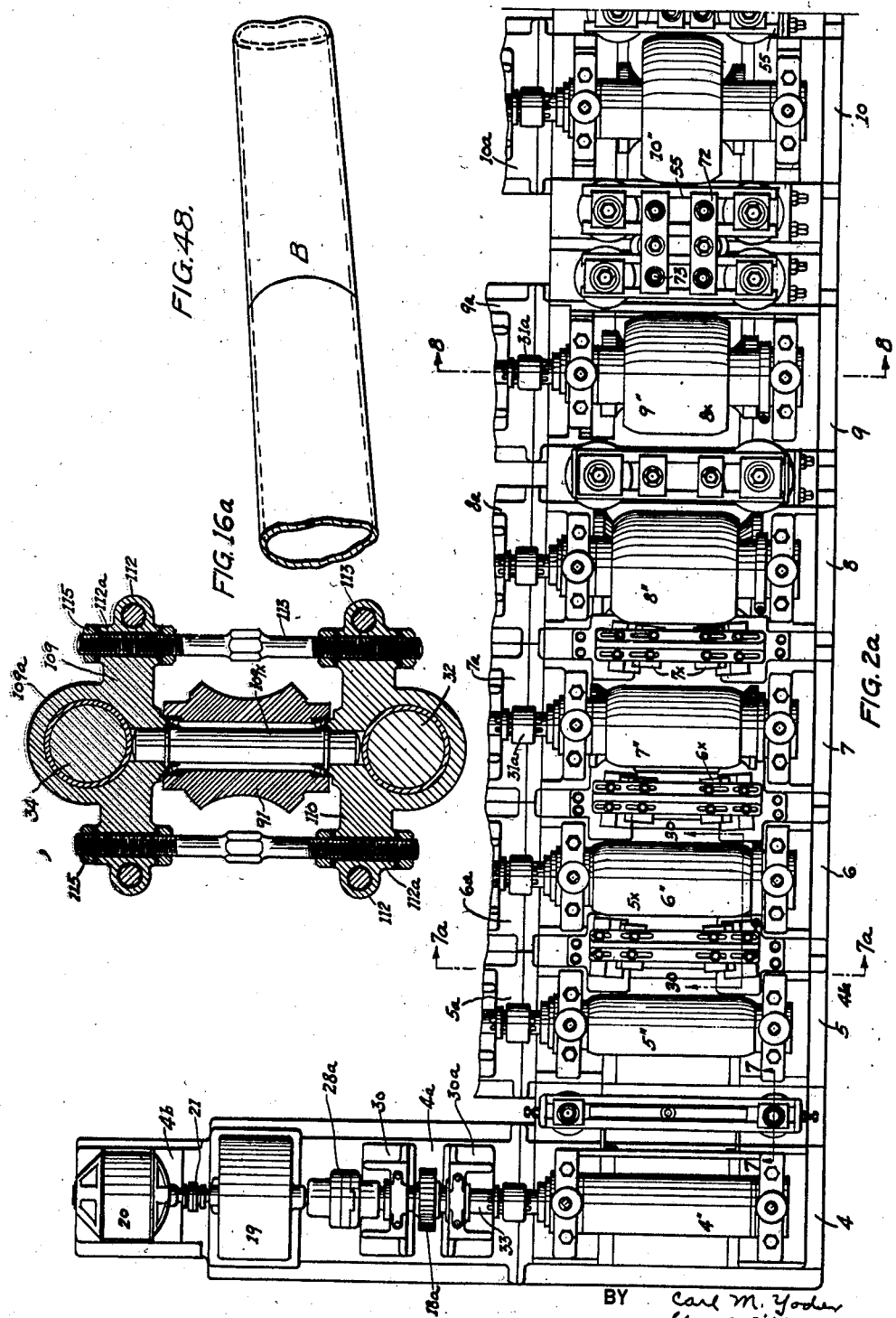

Referring to the figures, 1 indicates supporting means preferably comprising bases 2, 3, 4, 5, 6, 7, 8, 9, 10, 11, 12, 13, 14, 15, 16 and 17 on which the feeding rolls, cutting or slotting mechanism, the plurality of main sets of curving or bending rolls, the intermediate sets or groups of rolls, the severing means and certain other parts and mechanisms hereinafter referred to are mounted, and supplemental bases 2a, 3a, 4a, 5a, 6a, 7a, 8a, 9a, 10a, 11a, 12a, 13a, 14a, 15a and 16a, respectively on which portions of the driving means therefor are mounted, each supplemental base being secured to one of the main bases and supporting the shafts for a pair of driven gears 18, 18a. The shafts for one pair of gears are connected to the shafts of the preliminary cutting or slotting members and the shafts for each remaining pair of gears are connected to the lower and upper rolls, respectively, of one of the main sets of feeding or bending rolls. Each supplemental base supports a suitable reduction gearing 19 for driving the adjacent gears 18, 18a. Also, associated with (but preferably rigidly secured to) the supplemental bases are auxiliary bases designated 2b, 3b, etc., each of which supports a motor 20 (preferably an electric motor), the shaft of the motor being connected through a suitable coupling 21 to the main shaft 22 of the adjacent reduction gearing 19. Each reduction gearing 19 may consist of a gear 23 (see Figs. 6 and 6a) fixed to the adjacent shaft 22 and meshing with a pinion 24. The pinion 24 is fixed to a shaft 25 carrying a gear 26, which meshes with a pinion 27 fixed to a shaft 28. The reduction gearing 19 is mounted within a sectional housing 19a, the walls of which support suitable bearings for the shafts 22, 25 and 28. Each shaft 28 (except the shaft 28 which drives the cutting rolls 3', 3'') is connected through a coupling 28a with a shaft 29, which has bearing in spaced standards 30, 30a, mounted on and secured to the adjacent supplemental base (see Fig. 15) and carries between the standards the adjacent gear 18, the gear being suitably keyed to the shaft; and the shaft 29 in turn is connected through a coupling means 31 (the elements of which are detachable) to the adjacent lower roll shaft 32. 33 indicates a shaft mounted in suitable bearings 33a supported by the standards 30, 30a, and having keyed to it the adjacent gear 18a. The shaft 33 is connected through a coupling means 31a (which is preferably similar to the coupling means 31) with the adjacent upper roll shaft 34. The ratio of the gears 18, 18a, for driving the shafts 32, 34, for each main set of rolls is such that said bending rolls have the same peripheral speed.

Each coupling means (indicated at 31 and 31a) comprises the following, reference being made particularly to Figs. 17 to 21, inclusive: 120 indicates a plurality of recesses formed in the outer surface of the shafts 29 and 32 and extending inwardly from their ends, those in one shaft being brought into registry with those in the other shaft when the shafts are to be connected to drive the roll shaft 32. These recesses are substantially V-shaped in cross section as shown in Fig. 19, and form between them longitudinal guides or ribs 121, those recesses formed in one shaft (for example, shaft 29) being longer than those formed in the other shaft. 122 indicates a collar the inner walls of which are complementary to the recesses 120 and ribs 121, and permit the collar to slide laterally on to shaft 29, as shown in Fig. 17 (in which position the shafts are disconnected) or to slide into overlapping relation to both shafts, as shown in Fig. 18 (in which position the shafts are coupled or connected through the interlocking relation of the inner walls of the collar with the ribs 121 on both shafts), such movement being limited by the end walls of the recesses formed in the shaft 32. When the shafts 29, 32, are connected I insert in the exposed portions of the recesses formed in the shaft 29 suitable fillers 123, preferably formed of wood, which are wedged between the collar and end walls of the adjacent recesses and cooperate to prevent endwise movement of the collar. The fillers may be held in the recesses by a strap 123a or equivalent means. It will be understood that the shafts for the upper and lower rolls of each roll set and the preliminary cutting or slotting members 3'—3'' are driven in the manner and by mechanism similar to that above described, (corresponding parts being indicated by the same reference characters), except that the shafts for these members are controlled by an automatic power connection and disconnection mechanism (to be later described), so that it will not be necessary to duplicate this description for each set of rolls. It will also be understood that the bases 2, 3, etc. may be spaced from each other any desired distance depending upon the space required to accommodate parts between or associated with the main sets of rolls, or for other reasons. The cutting members 3', 3'' are detachable from their driving shafts and the bending rolls are removable from their shafts 32, 34, as later set forth, to permit substitution of members and rolls of a different size.

The feeding rolls and main sets of bending rolls between which the material A is passed, except the last four sets (to which reference will later be made), comprise lower and upper rolls 2'—2'', 4'—4'', 5'—5'', 6'—6'', 7'—7'', 8'—8'', 9'—9'', 10'—10'', 11'—11'' and 12'—12'', respectively; however, I may provide a larger or lesser number of sets of rolls depending upon the thickness of the material or stock and more especially on the diameter of the body being formed, in order to effect progressive bending thereof in a rapid manner without undue stresses on the metal.

Figure 8:
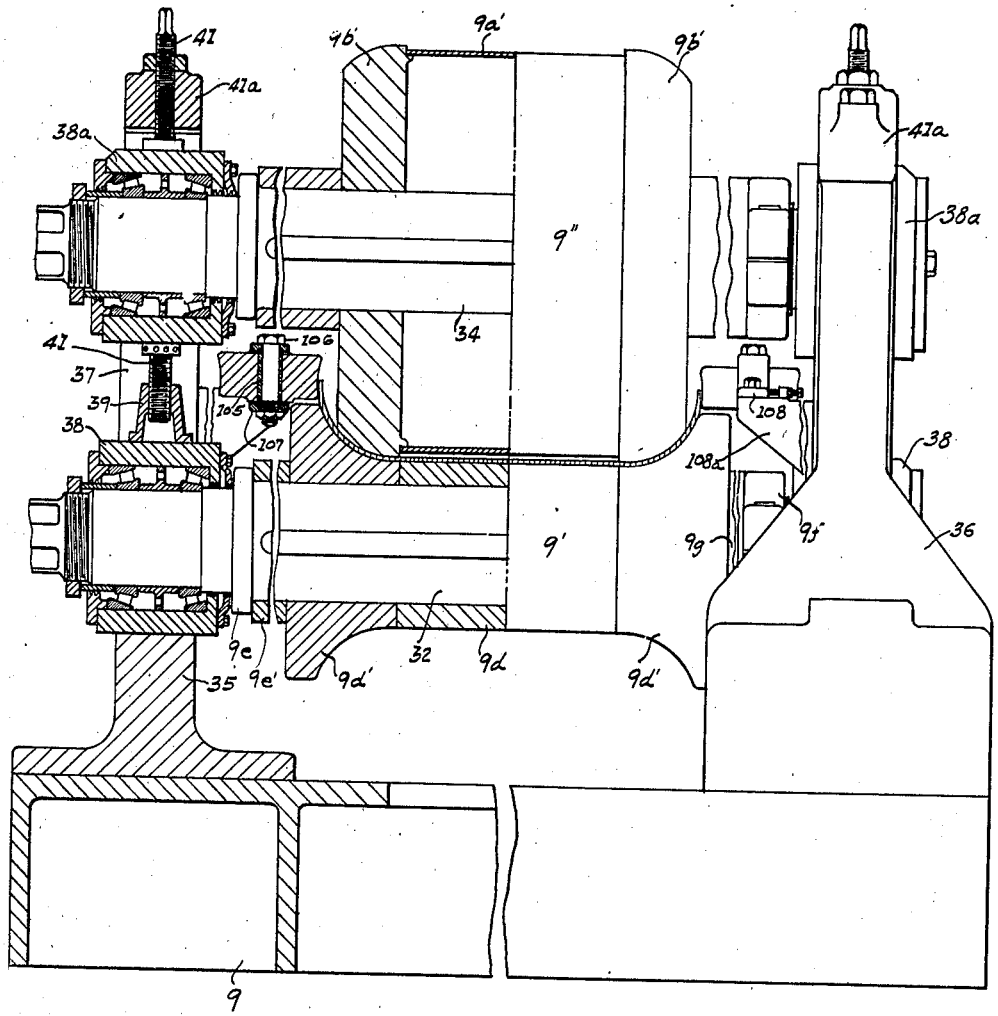

The shafts for each main set of rolls above identified are mounted in a similar manner, so that the following description of the mounting for the rolls 9'—9''. (as shown in Fig. 8) will suffice for the remaining mountings. The base 9 mounts adjacent its opposite ends standards 35, 36, each having openings 37 to slidably and adjustably receive the grooved side walls of upper and lower journal boxes 38, 38a, for the opposite ends of the adjacent shafts 32, 34, respectively. The boxes 38 for the shaft 32 preferably rest on the bottom walls of the openings 37, whereas the boxes 38a for the shaft 34 are adjustably mounted in these openings and removably clamped in fixed relation to the boxes 38. For this latter purpose, I provide on each box 38 a pedestal 39 threaded internally at its upper end to receive an adjusting screw 40, which at its upper end engages the adjacent box 38a. By rotating the screws 40 the shaft 34 may be adjusted, the effect of which is to space the adjacent upper roll relative to the co-acting lower roll dependent upon the thickness of the material. Each upper box 38a is rigidly secured against the screws 40 by a bolt 41 threaded in and through an opening formed in a cap plate 41a suitably bolted to the upper ends of the adjacent standard 35 or 36. Where, by reason of the diameter of the upper rolls (see rolls 2'', 4'', 5'', 6'', 7'') the journal boxes for the roll shafts are spaced relatively close, I omit the pedestal 39 and use one or more relatively short screws 40. The journal boxes for each roll shaft 32, 34, are preferably provided with sets of anti-friction taper roller bearings 32a, as shown in Fig. 8.

The feeding rolls 2'—2'', 4'—4'' and bending rolls 5'—5'', 6'—6'', etc. may be constructed in any desired manner, but are preferably of sectional construction. Each lower roll may consist of a center section 9d and side sections 9d', each section being keyed to and removably mounted on the shaft 32 as follows: 9e indicates a collar integral with and disposed at the inner end of the shaft 32, inwardly of the adjacent bearing box 38. 9e' indicates a removable sleeve between the collar 9e and the adjacent roll section 9d'. At the outer end of the shaft, inwardly of the adjacent bearing box 38, I provide a threaded portion for a ring nut 9f (preferably a split nut) which engages a removable sleeve 9g and through the latter clamps the roll sections end to end and against the collar 9e. By substituting the roll sections and sleeves for corresponding parts of the desired size and shape, the roll may be adapted to curving material of any desired width and radius.

The upper roll 9'' may be similarly constructed and mounted on its shaft 34. Where the upper roll is relatively large, the intermediate section may comprise a sheet metal cylinder 9a' mounted at its ends in circumferential seats provided on the inner faces of the outer sections 9b'.

The construction herein illustrated is adapted to shape suitable material A having approximately a ½ inch thickness into cylindrical bodies having a diameter of twenty inches. Each main set of bending rolls 5'—5'', 6'—6'', 7'—7'', 8'—8'', 9'—9'', 10'—10'' and 11'—11'' is arranged to simultaneously curve or bend lateral portions of the material on longitudinal lines on radii of approximately nine and one half inches, this curving being of less radius than the predetermined radius of the completed body to bend the material on longitudinal lines beyond its elastic limit; and following each bending operation, the bent portions are subjected to an intermediate pass between a set or sets of rolls as later described.

The intermediate sets of rolls are indicated at 5x, 6x, 7x, 8x, 9x, 9x', 10x, 10x', 11x, 12x and 13x respectively. The sets of rolls 5x, 6x and 7x are similarly mounted and function to (a) partially bend the material in advance of the next rearward main set of main rolls to relieve strain on the latter and to eliminate an undue bending operation on the material thereby, as indicated in dotted lines at $a^x$ in Fig. 30 and (b) re-shape or curve the previously bent portion of the material to and maintain it on a predetermined radius corresponding to the diameter of the completed body. The sets of rolls 8x, 9x, 9x', 10x, 10x', 11x, 12x and 13x are similarly mounted and arranged to engage the previously curved or bent portions of the material as hereinafter described, to re-shape or curve them to and maintain them on the predetermined radius corresponding to the diameter of the completed body and for the purpose of conditioning or working the marginal portions of the material and guiding them to the final shaping rolls to prevent wrinkling and distortion of the material along or adjacent its edges, whereby the marginal portions of the material are uniformly bent, and in the final shaping of the material into cylindrical form, the side edges are parallelly alined.

As the sets of rolls 5x, 6x and 7x are similar in construction and similarly mounted, only one set (5x) and its mounting will be described as follows (see Fig. 29):

This set of rolls comprises two pairs of co-acting inner and outer rolls 42—42a, 42—42a, the periphery of these rolls having curved cross sections struck on the radius of the completed body. The rolls 42a have a length in the direction of their axes substantially equal to and are engaged by that portion of the material previously bent or curved by the adjacent forward main bending rolls 5'—5'', whereas the rolls 42 are relatively narrow and are mounted so as to engage portions of the curved material which engage the rolls 42a and adjacent, inward unbent portions of the material beyond the inner ends of the rolls 42a. In this arrangement the rolls 42—42a, 42—42a, function to (a) re-shape those portions of the material bent-up by the adjacent forward main set of rolls to their final or predetermined radius and (b) effect a preliminary curving of the adjacent inward portions of the material along longitudinal lines on a radius larger than the radius of the bending portions of the adjacent rearward main bending rolls 6'—6'', preferably on a radius equal to the radius of the completed body, as shown in full lines in Fig. 30. By this arrangement, the material is partially curved before it engages with the next succeeding main set of rolls 6'—6'', so that the strain on the rolls and the material in curving its adjacent inward lateral portions to the smaller radius is reduced. The pairs of rolls 42—42a are mounted as follows: 43 indicates a pair of upright supports suitably secured to an intermediate base 5c. The supports 43 comprise castings suitably secured (as later set forth) to the base 5c and support on their upper ends a cross member 44. Each support 43 is formed with a recess 43a, the end walls of which support a shaft 45 to which the adjacent outer roll 42a is suitably fixed. 46 indicates brackets fixed to and depending from the cross member 44, each bracket having bifurcations in which is mounted a shaft 47 carrying the adjacent inner roll 42. The supports 43 are adjustably bolted to the base 5c, the bolts extending through slots formed in the base and elongated transversely to the direction of movement of the material A. The cross member 44 is adjustably secured to the supports 43 in the same manner to permit of adjustment of the latter and the brackets 46 are adjustably secured to the cross member 44 by bolts extending through elongated slots, so that the rolls 42 may be adjusted relative to the rolls 42a and each other.

Each set of rolls 6x, 7x, co-operates with the adjacent rearward and forward sets of rolls to re-shape the last curved or bent-up portions of the material to effect a preliminary curving on adjacent inward portions thereof as described in connection with the roll set 5x, for which reason descriptions of the operations of the roll sets 6x and 7x are omitted.

Figure 34:
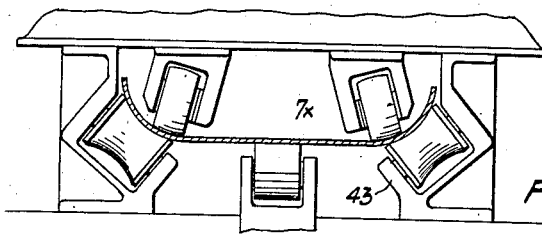
Figure 35:
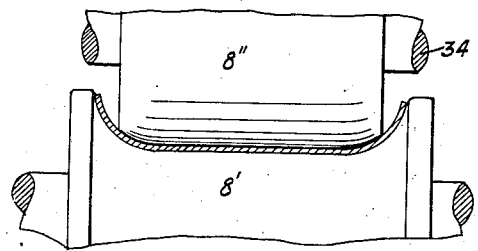

If desired, for the purpose of supporting the intermediate or central portion of the material A, while its lateral portions are engaged by each roll set 5x, 6x and 7x, I may provide on each base 5c, 6c and 7c, a bifurcated member 43x for supporting a roller 42x, which engages the central portion of the material (see Figs. 29, 32 and 34).

The rolls of each roll set 8x, 9x, 9x', 10x, 10x', 11x, 12x and 13x are differently related and certain thereof function in a different manner or for a different purpose, as compared to the pairs of rolls 5x, 6x and 7x above described.

Figure 7:
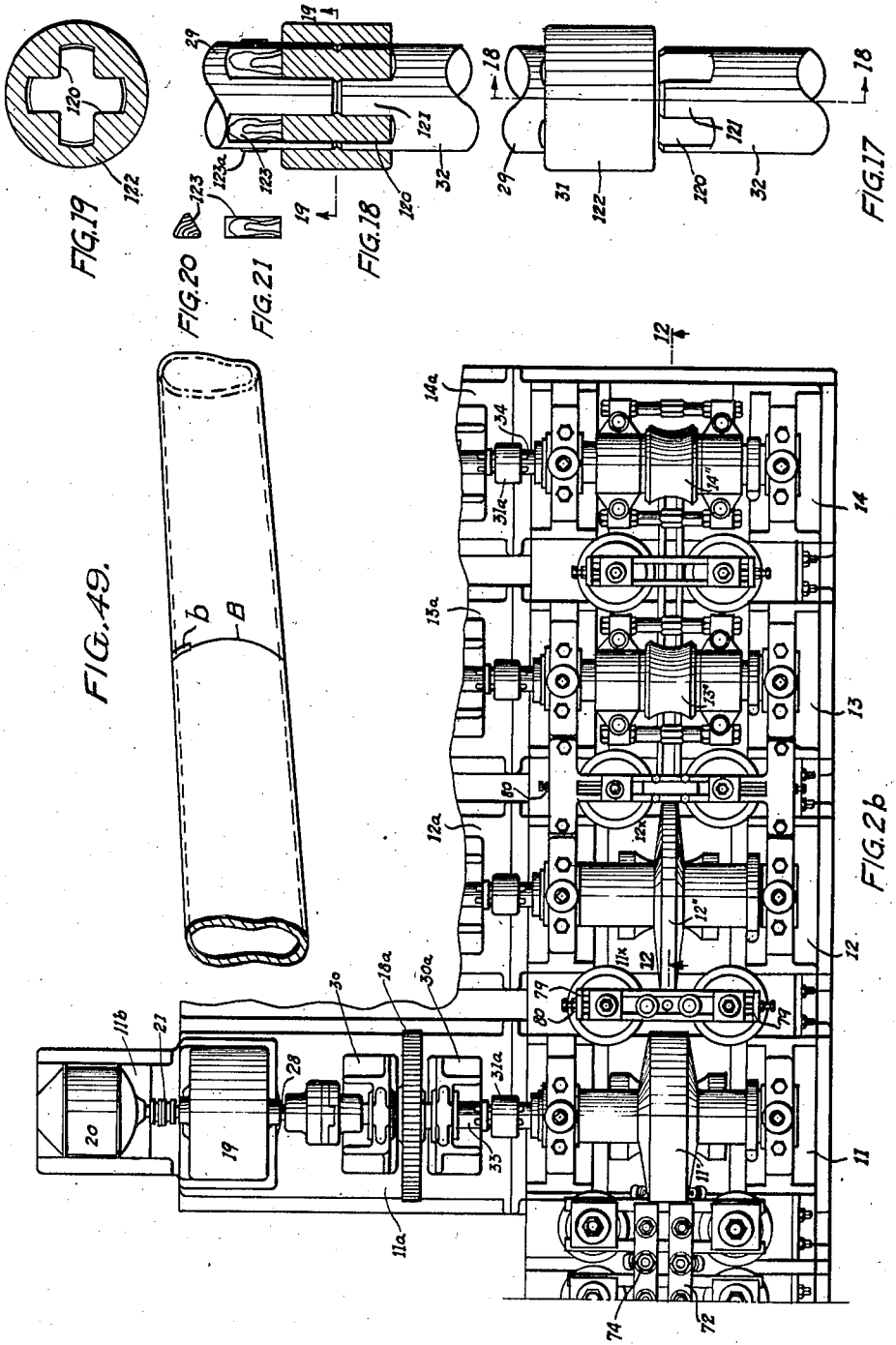

The set of rolls 8x also serves to re-shape the portions of the material bent up by the bending rolls 8'—8'' as they feed to the bending rolls 9'—9'', to their final or predetermined radius. This set of rolls comprises pairs of outer and inner rolls 48, 49, the peripheries of which, in cross section, have radii equal to the predetermined radius of the completed body or cylinder, the inner rolls serving to press or force the curved portions of the material against the outer rolls. The outer rolls 48 of this set and the corresponding rolls of other roll sets 9x, 9x', 10x, 10x', 11x and 12x and 13x (also the edging rolls—Fig. 7—later referred to) are similarly mounted at their lower ends as follows (see Figs. 11 and 36): 50 indicates a cross member secured to base blocks 8c, which in turn are secured to the adjacent bases 8, 9. The side walls of the support 50 are cut away at 50a and these side walls are provided with plates 50b which overhang the cut-aways to form guides extending transversely to the direction of movement of the material A for slidably supporting a pair of shoes 51. Each shoe 51 is provided with an upstanding spindle or shaft 51a (preferably formed integrally with the adjacent shoe) on which the adjacent roll 48 is mounted (see Fig. 36). The shoes 51 are provided with depending lugs 52 (each off-set relative to the other), as shown in Fig. 7, formed with threaded openings in which are mounted feed screws 53, 53, respectively. The outer portion of each screw 53 extends through and rotates in an opening formed in a wall 54 (such as a casting) bolted to the outer end of the support 50 and at opposite sides of the wall 54 the screw is provided with suitable collars 53a, which engage the wall so that when the screw is rotated it will be held against endwise movement. As shown, the inner collar 53a is fixed to the shank of the screw, whereas the outer collar 53a is held in place by a nut 54a threaded on the shank, the tightening of the nut serving to clamp the collars 53a to the wall 54 to lock the screw against rotation. The shank of each screw 53 is extended beyond the nut 54a and shaped to take a suitable tool, whereby the screw may be rotated. As will be understood, the collars 53a, 53a, take the thrust imparted to the screws due to the lateral pressure on the adjacent pair of rolls. By rotating the screws 53, the shoes 51 may be adjusted independently, each toward or from the other shoe, to locate the rolls 48 in proper relation to the marginal edges of the blank A. Suitable anti-friction bearings may be provided between the upper and lower ends of each roll 48 and the adjacent shaft 51a. The upper ends of the shafts 51a may be adjustably tied together to hold the shafts vertically and to resist the lateral strains incident to the shaping, rolling down and conditioning of the blank edges.

In the set of rolls 8x, the tie means for the shafts 51a which support the rolls 48 also adjustably support the rolls 49, as will be understood from the following description: 55 indicates a pair of channels provided at their opposite ends with angles 56 (see Fig. 36a) to which are secured by suitable bolts and plates 57. The plates 57 rigidly secure the channels together in spaced relation. As shown in Figs. 36 and 36a, the shafts 51a extend through clamping blocks 58, 59, and between the channels 55, and are threaded at their upper ends to take nuts 60; also, the blocks 58, 59, are recessed along their opposite sides to engage the lower and upper edges of the channels 55 and the lower block 58 engages the ring nut for the adjacent anti-friction bearing. Accordingly, by tightening the nuts 60, the assembly (blocks 58, 59, channels 55 and ring nuts) are rigidly secured together. By loosening the nuts 60, the shafts 51a may be adjusted by operation of the screws 53, as already set forth.

The means for supporting each roll 49 comprise the following: 61 indicates a supporting device having its opposite edges recessed to engage the lower edges of the channels 55. The upper face of the device 61 is formed with a threaded recess or hole to receive the lower end of a bolt 62. The upper end of the bolt 62 extends through a clamping block 63 which is provided with recesses along its opposite edges to engage the upper ends of the channels. Accordingly, by tightening the bolt, the device 61 and block 63 will be clamped to the channels. Below the channels 55, each device 61 is provided with lateral extensions which form pillow blocks 64 for caps 64a, the latter being secured to the blocks by suitable bolts. The pillow blocks 64 and caps 64a form supports for trunnions 65 provided on a bracket 66. The bracket 66 is provided with bifurcations to support the ends of a shaft on which the adjacent roll 49 is secured. The caps 64a serve to clamp the trunnions to prevent rotation thereof and when loosened they permit rotative adjustment of the trunnions to secure the bracket in the desired position, so that the roll 49 will be held in operative relation to the roll 48 and in any desired relation to the marginal edge of the material A. It will be understood that by means of shims or washers between the ring nuts for the roll anti-friction bearings and the clamping blocks 58, adjustment of the device 61, adjustment of the bracket 66 and/or interchange of rolls, this set of rolls may be arranged to operate on material of any size, thickness and curvature.

The sets of rolls 9x, 9x', are correlated with a pair of co-acting rolls forming one roll group and the sets of rolls 10x, 10x', are correlated with a pair of co-acting rolls forming another or separate roll group. I also associate with the separate roll group a pair of auxiliary rolls to guide the marginal portions of the material to the next rearward set of rolls 11'—11''. While the pairs of co-acting rolls serve to maintain the curved portions of the material against the outer rolls with which they are associated, these groups of rolls perform a different function as compared to the sets of rolls 5x, 6x, 7x and 8x, already described, in that they bend inwardly and outwardly the previously curved portions of the material adjacent the marginal edges thereof on transverse lines beyond its elastic limit, the effect of which is to eliminate tendency of the material due to its inherent resiliency to flex or bend into an abnormal shape or its longitudinal side edges to wrinkle or stretch longitudinally as the material in its shaped form feeds to the welding means or is delivered from the apparatus whether the resulting seam is welded or not. As these roll groups act on the marginal portions of the material, it will be seen that such portions may be positively guided and controlled, without danger of distortion or wrinkling and that in the final shaping of the material its side edges are, throughout the length of the shaped material, brought into spaced aligned relation (see Figs. 46 and 47) ready for welding.

The first group of rolls comprise pairs of outer rolls 67—67, 67a—67a, and co-acting rolls 68, 68, disposed in a transverse plane between them. The second group of rolls comprise pairs of outer rolls 69—69, 69a—69a, a pair of co-acting rolls 70, 70, disposed in a transverse plane between them and a pair of auxiliary pressure rolls 71, 71, disposed in a transverse plane rearward of the rolls 69a—69a, and serving to force or press the material outwardly into engagement with the next rearward main bending roll 11'. As will be understood from Figs. 38, 9, 10, 10a, 10b and 40, the rolls of these groups engage the previously bent portions of the material adjacent its marginal portions and the rolls of each group are so related to each other that these portions are bent inwardly and outwardly on transverse lines and also so related to the adjacent rearward main set of rolls that the latter may co-operate with the other main bending rolls to effect the progressive bending of the material. As a result of this arrangement, the steps of progressive bending of the material and conditioning the opposite marginal portions of the material are carried out simultaneously.

Figure 38:
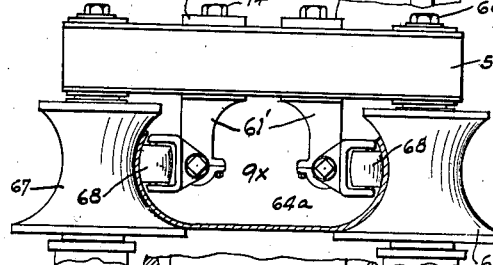
Figure 39:
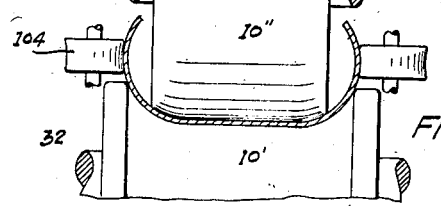
Figure 40:
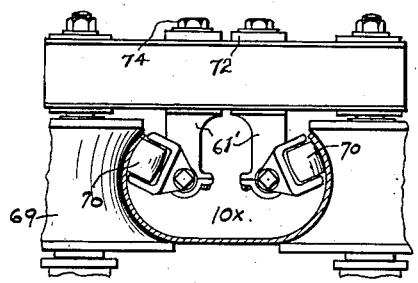
Figure 41:
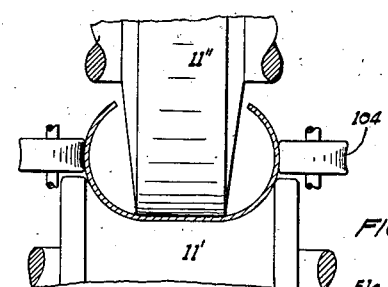

The rolls 67, 67, 67a, 67a, 69, 69, 69a, 69a, are preferably supported or mounted similarly to the rolls 48 and also connected together at their upper ends by suitable tie means, preferably similar in construction to the tie means already described, except that the channels 55 are all connected rigidly to longitudinal bars 72 which are secured to the tops of the channels by clamping devices engaging the bottoms of the channels, the bars and clamping devices being held by bolts 73. The bars 72 serve as supports for each pair of co-acting rolls 68, 70 and the auxiliary guiding rolls 71. As shown in Figs. 38 and 40, the rolls 68, 70 and 71 are mounted similarly to the rolls 49, except that the supporting devices (designated 61') are extended downward and their upper ends engage the adjacent opposed channels 55, to which they are secured by bolts 74 extending through openings in the bars 72. As will be understood from Figs. 10, 10a and 10b, these rolls may be angularly adjusted to any desired position.

The rolls 11x, 12x and 13x are mounted in the manner already described in connection with the rolls 8x. The upper ends of the shafts 51a for these rolls are adjustably tied together in the following manner: 75 indicates slides mounted on the upper ends of the shafts 51a. Each slide 75 consists of two spaced parts (see Fig. 11) fitting over the adjacent shaft 51a and flanged to slidably fit the inner side walls of a tie member 76, the lower part resting on a shoulder formed by reducing the upper portion of the shaft, and these parts being clamped against the upper and lower faces of the tie member 76 by a nut 77 threaded on the free end of the shaft. I also prefer to provide adjustable abutments, which engage the outer sides of the slides 75 to reinforce the clamping means therefor. Each abutment comprises a rod 78 having a threaded portion fitting a threaded opening formed in the adjacent end wall 79 of the guide-way and held in adjusted position by a lock nut 80 (see Fig. 2b). Each abutment is adjusted so that its inner free end is in engagement with the adjacent slide 75 to prevent lateral flexing or bending moment on the adjacent shaft 51a.

Each tie member 76 may be extended at its ends and secured to the adjacent standards 35, 36, or bridge members 41a thereon, if desired, the tie member 76 for the shafts of the roll set 12x only being shown so connected.

81 indicates a pair of rolls preferably carried by the tie member 76 for the shafts 51a of the roll set 11x (see Fig. 42) and arranged to be engaged by the longitudinal side edges of the material A as it moves from the set of rolls 11'—11" to the set of rolls 12'—12". The rolls 81 are grooved to receive the material side edges and operate to maintain the curved portions of the material against the rolls 11x. Referring to Figs. 14 and 42, 82 indicates a pair of adjustable blocks, constructed similarly to the slides 75, and slidably fitting the guide-way in the adjacent tie member 76. 83 indicates a bolt passing through the openings in the parts of each block and carrying on its lower portion a bushing on which the adjacent roll 81 loosely rotates. As shown, the lower part of the block engages the bushing, so that by tightening the nut 84, the parts of the block will be clamped to the opposite faces of the tie member 76. By loosening the nuts 84, each block 82 may be adjusted along the guide-way to locate the adjacent roller in the desired position.

85 indicates as an entirety means for conditioning the longitudinal side edges or marginal portions of the material or blanks, whereby these side edges, when aligned and spaced in edge to edge relation upon the final bending or curving of the material into cylindrical form, may be readily and effectively welded, to provide a joint that is liquid and gas tight, as well as capable of withstanding internal and external pressure. The conditioning means are preferably arranged between the feeding rolls 4'—4" and the first bending pass or set of rolls 5'—5". When the material A comes from the cutting mechanism, such as gang shears, its longitudinal side edges are not only rough and ragged, but each may be formed with an offset such as shown at a in Fig. 50. These side edges are rolled down by a pair of conditioning rolls to produce flat side edges a', preferably disposed at right angles to the opposite faces of the material, as shown in Fig. 51. The conditioning rolls, indicated at 86, are mounted and their shafts 51a are tied together similarly to the set of rolls 11x.

Each roll 86 is formed centrally with a peripheral groove 86a to receive the marginal portion of the blank A as it moves from the feeding rolls 4'—4" to the bending rolls 5'—5". The bottom of the groove 86a is preferably parallel to the roll axis and the upper and lower faces of the groove are at right angles to its bottom, and co-operate therewith to roll down the marginal portions and side edges of the material to finish these side edges, as shown at a' in Fig. 51. When desired the bottom of the groove may be disposed at an angle to the roll axis, in which event the side edges of the material A will be inclined.

I provide two sets of final bending and sizing rolls, indicated at 87, 88. These sets of rolls are similar in construction, as later described. Each set comprises lower and upper rolls 13'—13" or 14'—14" mounted on the adjacent shafts 32, 34, respectively, which are mounted and driven in the manner already set forth. These rolls have associated with them a pair of side rolls 91, 91, supported by the shafts 32, 34, at opposite sides of the upper and lower rolls in such manner (as will later be described) that all of the rolls of the set and their shafts may be removed as a unit from the adjacent standards 35, 36, without disassembly, whereby sets of rolls for a different diameter of shaped material may be substituted. The final bending and sizing rolls 13'—13", 91—91, 14'—14", 91—91, co-operate with a mandrel indicated as an entirety at 93, to bend or curve the intermediate or central portion of the blank on substantially the predetermined radius of the completed body and to size the shaped body.

Figure 44:
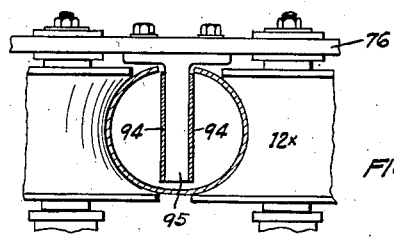
Figure 45:
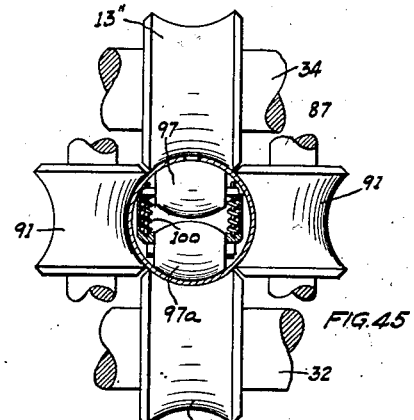
Figure 46:
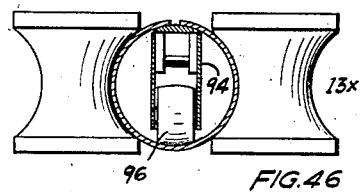
Figure 47:
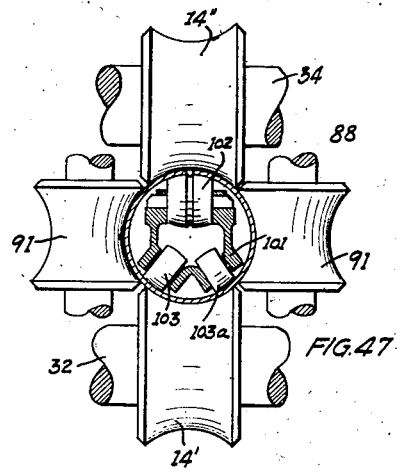

The mandrel 93 comprises a pair of spaced sectional plates 94, secured at their front ends to a hanger 95 mounted on adjacent standards or depending from the tie member 76 for the shafts on which the rolls 12x are mounted (see Figs. 11, 12 and 44). Between the spaced plates 94 are mounted rollers 96 which support the mandrel on the inner wall of the shaped body. On the upper ends of the spaced plates 94, in front and in rear of the rolls 13', 13", I provide shoes 96' having depending lugs suitably secured to the plates 94, the shoes serving to support the marginal edges of the shaped body as it moves relative to the mandrel 93. In the plane cutting the axes of the lower and upper rolls 13'—13" I provide a pair of rollers 97, 97a, which engage the upper and lower walls of the shaped body and co-operate with the rolls 13', 13", 91, 91, to curve the central portion of the body on substantially the predetermined radius, thereby completing the curving of its walls. The shafts for rollers 97, 97a, are mounted in a frame comprising side members 98 arranged between and connected at their opposite ends to the sections of the plates 94 (see Fig. 12). The shaft for the roller 97a is mounted in suitable bearings provided in the side members 98. The shaft for the roller 97 is provided at its opposite ends with blocks 97' which slidably fit slots or ways 99 formed in the side members, coiled springs 100 being provided between the blocks and the bottoms of the slots 99 to normally press the blocks upwardly to maintain the roller 97 yieldingly against the inner walls of the shaped body. 101 indicates a frame secured to the rear ends of the mandrel plates 94. The frame 101 is shaped to provide spaced supports for the shaft of an upper roller 102 and lower rollers 103, 103a, which engage the inner walls of the shaped body at opposite sides of its central portion (see Fig. 47) to eliminate tendency of the shaped body and mandrel to twist.

Referring to the roll set 87, 109 indicate pairs of upper and lower truss members, each pair having collars 109a loosely fitting the adjacent shaft 32 or 34, at opposite sides of the bending rolls 13'—13" thereon. The arms 110 of each member 109 extend forwardly and rearwardly relative to the adjacent shaft and the outer end of each arm 110 is provided with a pair of hollow bosses 112, 112a, the former extending horizontally and aligned with the horizontal boss 112 of the adjacent arm of the other truss member of the pair and the latter extending vertically and aligned with the boss 112a of the adjacent arm of the corresponding truss member on the other roll shaft. 113 indicates horizontal and vertical rods, each horizontal rod having its opposite ends extending through each two aligned horizontal bosses and each vertical rod having its opposite ends extending through each two aligned vertical bosses, each end portion of each rod being threaded to take nuts 115 which are clamped against the opposite ends of the adjacent boss. By reason of the construction above described, the truss members are rigidly connected together and held against relative movement on the shafts 32 and 34; also, the shafts 32, 34, are tied or connected together as a unit so that each set of rolls 13'—13"—91—91 and 14'—14"—91—91 may be removed from the adjacent standards as a unitary assembly upon the removal of the cap plates 41a.

The foregoing construction for supporting each roll set 87 and 88 is advantageous for the reason that the rolls are capable of withstanding tremendous outward pressure. As a result, each set of rolls may be so related that the shaped body will be compressed circumferentially while maintaining a predetermined space between the side edges a', where the body is to be fed directly to a welding apparatus, as shown. In this arrangement, a similarly constructed and supported set of rolls (hereinafter designated 133) is utilized to finally circumferentially engage and size the body to a predetermined diameter. Where the shaped body is to be welded by a separate welding mechanism, the roll set 88 may be utilized to finally size the shaped body.

104 indicates pairs of supporting rolls associated with the main sets of rolls 9'—9", 10'—10", 11'—11", 12'—12", in the transverse plane thereof, respectively. Each roll is loosely mounted on a bushing 105 secured in position by a bolt 106, the bolt being mounted in a hollow frame 107 having laterally extending lugs 108 rigidly, but adjustably secured to a bracket 108a. Each bracket 108a is suitably secured to the adjacent standard. The pairs of rolls 104 serve to engage the curved portions of the material which extend beyond the lower bending roll of each pass.

131 indicates a suitable welding apparatus mounted between sets of rolls 132, 133. Each set of rolls 132, 133, is constructed and driven similarly to the set of rolls 87, so that a description thereof will not be necessary. The welding apparatus 131 is preferably of the electric type, but other types or methods of welding may be used.

The preliminary cutting mechanism comprises, as shown in Figs. 1, 2, 3 and 22, the rotatable members 3'—3" the inner ends of which are removably connected to and driven by the adjacent shafts 29, 33, respectively. Each member 3', 3" is formed with a longitudinally extending recess 116 in which a cutter or up-setting device 117 is seated against the inner ends of abutments, such as screws 117a threaded through openings in the member and locked by jam nuts 117b, the opposite side of the member being formed with openings to accommodate the screw heads and nuts. The screws 117a serve as a means to adjust the device 117. Each device 117 may be secured in its recess by a wedge 118, secured to the member by a countersunk screw 119. The cutting or up-setting devices 117 co-act, when the members 3', 3", are rotated, to slit or up-set the material A along its intermediate portion as shown at B in Figs. 24 and 25. The cutting edge of each cutting device is preferably inclined from its center outwardly toward the axis of the adjacent member 3' or 3". In this arrangement the ends of each slit terminate without tearing or severing the material on longitudinal lines and causing a resulting weakness adjacent the ends of each slit.

As the slitting of the material A is effected at predetermined intervals, the cutting device carrying rolls 3', 3", are rotated one revolution and then stopped by the following mechanism: 134 indicates a shaft mounted on suitable standards 135 secured to the bases 3a, 3b (see Figs. 2 and 2d). At its rear or outer end the shaft 134 is provided with a sprocket for a chain 136, which engages a sprocket on the shaft of the adjacent motor 20 (see Fig. 2), whereby the shaft 134 is continuously driven. The shaft 134 through a suitable reduction gearing in a casing 137 drives a cam 138 mounted on the opposite end of the shaft. The cam 138 controls the rocking of a lever 139, the inner end of which actuates the clutch element of a suitable clutch mounted in a casing 140. The reduction gearing within the casing 137 is adjustable to vary the speed of the cam 138, so that the latter will operate the lever 139 when and after the desired predetermined length of the material has passed a given point, namely a plane cutting the axes of the members 3', 3''. The casing 140 is associated with the adjacent shaft 28. The clutch therein is a one revolution type of clutch of any well known construction and automatically disengages when the shaft 28 has made one revolution and as the gears 18, 18a, between the shaft 28 and the shafts 32, 34, for the members or rolls 3'—3'' are of the same diameter, it will be seen that these rolls are connected to and driven by the adjacent motor 20 and are then disconnected when rotated one revolution, a drag brake 141 being provided to stop the rolls 3'—3'' when the clutch element is released.

*Operation*: The skelp or material A is delivered to the first set of material feeding rolls 2'—2''. The material then passes between the rolls 3'—3'' to the second set of feeding rolls 4'—4'', the rolls 3'—3'' being adjusted to permit the material to move between them. As this movement takes place, the rolls 3'—3'' are operated as above set forth to effect a co-action of the knives 117 to slit or upset the material transversely between its side edges as shown in Figs. 24 and 25, the reduction gearing being adjusted so that the slits will be spaced distances equal to the desired lengths of the bodies to be shaped. As the material passes between the second set of feeding rolls 4'—4'', the up-set ends of the slits are rolled down into the plane of the material as shown in Fig. 25a. From the feeding rolls 4'—4'' the material moves between the rolls 86a to condition their edges as already described, and then between the bending rolls 5'—5'', which simultaneously curve or bend the outer lateral portions of the material on a radius of approximately 9½ inches. As the predetermined radius of the completed body is 10 inches, the rolls 5'—5'' bend the material on longitudinal lines beyond its elastic limit. The curved portions of the material then pass between the intermediate set of rolls 5x the inner rolls of which press or force the material against the outer rolls 42a of the set and also partially bend the adjacent inward portions (see Fig. 30) ready for the pass between the main bending rolls 6'—6''. As the outer rolls 42a, 42a, of the roll set 5x have a cross sectional radius of 10 inches, the co-action of the rolls 42, 42a, bend or re-shape the previously bent portions to the predetermined curvature of the completed body (see Fig. 29). In the passes between the succeeding main bending rolls 6'—6'' and intermediate set of rolls 6x the adjacent inward portions of the material are similarly bent beyond their elastic limit and then bent or re-shaped outwardly to the predetermined radius and the next adjacent inward portions bent, as shown in Figs. 31 and 32. As the material makes the succeeding passes, the inward portions of the material are progressively curved and re-shaped until the central portion of the material is reached and finally the central portion is curved to the predetermined radius by the set of rolls 87.

Between the rolls 9'—9'', 10'—10'' and rolls 10'—10'', 11'—11'', the previously curved lateral portions of the material are engaged by the groups of rolls 67—68—67a and 69—70—69a, which bend the outer curved portions of the material beyond its elastic limit on transverse lines. This latter operation removes from that portion of the material adjacent its side edges all resiliency and any tendency of its marginal portions to wrinkle or its seam edges to flare. As a result, the shaped body is delivered to the welding apparatus 131 with its seam edges in spaced parallel alignment or where, prior to welding, the shaped material is delivered from the severing means (later referred to) or blanks of predetermined length are delivered from the sizing rolls 88, danger of the seam edges flaring is eliminated.

From the set of sizing rolls 88, the shaped material passes to the welding apparatus 131 and then to the final severing means 142, thereby fabricating as a continuous operation completely shaped and welded cylindrical bodies; where the welding apparatus is omitted, the shaped material passes direct from the roll set 88 to the severing means 142 and then each separate body may be moved or transported to a welding apparatus and its seam edges welded by the latter. Where the welding apparatus is correlated with the shaping sets of rolls and sizing rolls, as shown in Fig. 1, 1a, 1b and 1c, the welding devices (such as the electrodes of an electric welder) act along continuous integral walls, so that the metal is progressively heated and as the shaped material is severed into lengths or sections after the welding of the seam, no waste of the material at either end of the sections takes place.

In the foregoing description it will be noted that the contiguous lateral portions of the material are progressively subjected to successive main bending passes and following each main pass, the corresponding lateral portions are subjected to an intermediate pass which re-shapes such portions and effects a preliminary bend in the next inward contiguous portions in advance of the next main pass. As a result of these successive operations, the material from its lateral or side edges inwardly is progressively bent to the desired, predetermined curvilinear shape irrespective of its inherent resiliency.

Figure 5:
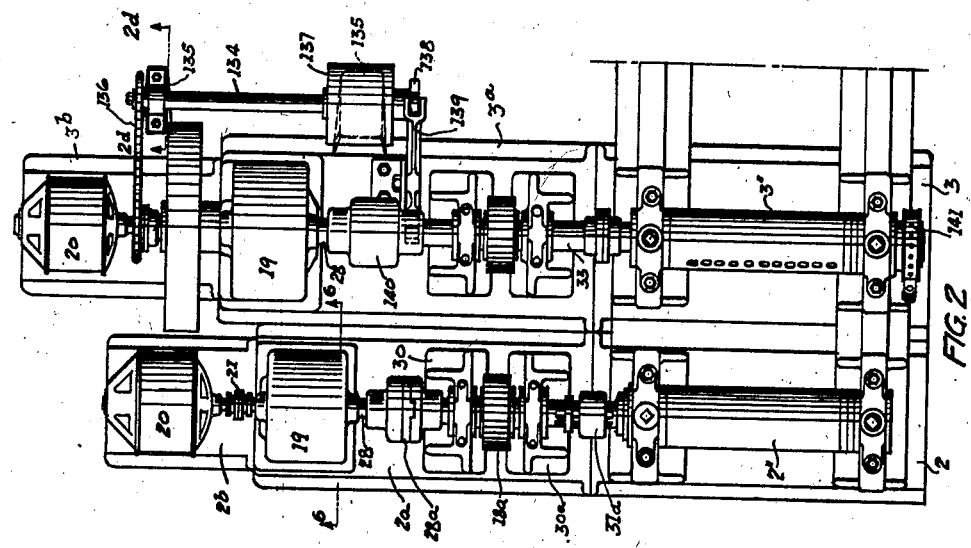
Fig. 5 is a detail view of parts shown in Figs. 1c, 2c and 4.

The severing means 142 is provided with a saw or cutter (preferably of the rotary type) arranged to automatically sever the shaped material along its un-cut portion transversely on lines co-incident with the preliminary cutting or slotting and to move with the shaped material during the severing operation, whereby the continuous supply and shaping of the material and welding of its resulting seam is not stopped and the sections of shaped material constitute complete cylindrical sections ready for use. The severing means, particularly shown in Figs. 1c, 2c, 4, 5, 5a, 23 and 23a, comprise the following: 143 indicates a rotary cutter fixed to one end of a shaft 144, which has bearing in and extends through a tubular member 145, and carries at its opposite end a power element (pulley or sprocket) 144a. The tubular member 145 is connected by sectional arms 146 to a pair of collars 147 rotatably mounted on the ends of the casing 148 of a suitable electric motor, the collars 147, arms 146 and tubular member 145 forming a frame swingable on the axis of the motor shaft. The motor shaft 149 is provided with a power element (pulley or sprocket) 150 which continuously drives the element 144a by an endless member 151. The sectional arms 146 are extensible so as to tighten the endless member when found necessary. The motor casing 148 is fixed to a slide 152 which reciprocates in ways 153 provided on the base 17. One collar 147 is provided with an arm 154 carrying at its outer end a depending link 154a having a roller 155 which engages a cam 156, the cam being provided on a bracket 157 fixed to the side wall of the base 17. Through the engagement of the roller 155 with the cam 156 in the rearward movement of the slide 152 (toward the right in Figs. 1c and 2c), the swingable frame is operated about the axis of the motor shaft, in opposition to a spring 158, to cause the cutter to engage the shaped material and cut it transversely as already described. The cutter carrying frame is swung in the opposite direction at the end of its rearward movement by the spring 158, which is connected to the slide 152 and an arm 159 extending from the other collar 147. The link 154a is rotatably mounted on the arm 154 and provided with a pin 154b which extends into a slot formed in the arm (see Fig. 5a). The pin 154b engages one end wall of the slot to prevent swinging of the link 154a when engaging the cam 156 in the rearward movement of the slide 152, but in the forward movement thereof, the link is free to swing about its axis, on the arm 154 to permit it to ride the cam 156 without swinging the cutter carrying frame. The slide 152 is reciprocated by the following means: 160 indicates a depending lug on the slide 152. 161 indicates a link pivoted at one end to the lug 160 and pivotally and slidably supported at its opposite end on a block 162, which is slidable in guides 163 fixed to the inner walls of the base 17. 164 indicates a shaft mounted in the side walls of the base 17 and provided with a crank 165 pivotally connected to a block 166 slidable in guides 167 provided on the link 161. The shaft 164 is provided with a sprocket 168, which through a chain 169 and a sprocket 170 fixed to one end of a counter shaft 171 is driven by the latter. The shaft 171 is mounted in suitable bearings 171a removably supported on one side wall of the base 17. The shaft 171 is preferably driven by a power means 172 connected to the shaft 28 which drives the roll set 133, but its connection with and disconnection from the power means is co-ordinated with the feed of the shaped material so that the movement of the cutter carrying frame is controlled to effect the final cutting operation along a line which coincides with each preliminary slotting or slitting, as shown at b in Fig. 49.

The power means comprises a sprocket 174 fixed to the shaft 28 for the roll set 133, a chain 173 engaging the sprocket 174 and a sprocket 172a fixed to a shaft 175 which is mounted in suitable bearings 175a removably mounted on the other side wall of the base 17 in alinement with the shaft 171 (see Fig. 64). The shafts 171, 175, are connected and disconnected by an automatically operating one-revolution clutch of suitable construction mounted within a casing 176 and having an operating element 177 which is released and then stopped by an arm 178 fixed to a rock shaft 178a, when the shaft 171 has made one revolution. The rotation of the shaft 171 will in turn effect throw of the slide 152 and swinging of the cutter carrying frame, as already set forth.

The shaft 178a is operated in any desired manner, mechanically or electrically, by the feed of the material, so that the shaft 171 is set in operation to effect movement of the saw 143 with the material and into engagement therewith in line with the preliminary slitting or cutting.

As shown in Figs. 62 and 63, the shaft 178a is provided with an arm 178' to which one end of a spring 179 is connected, its opposite end being connected to an adjustable screw 180, the spring operating through the arm 178' and shaft to normally hold the arm 178 in position to engage the element 177. The arm 178' is connected by a link 181 to the core of a solenoid 182. The circuit for the solenoid winding comprises leads 183, 183a, connected to the supply mains 184, 184a, the circuit being closed by a switch the contacts of which are carried by the armature of a relay 185. 186, 187 indicate electromagnets the respective poles 186a, 187a, of which are spaced longitudinally of the shaped material A and mounted in close relation thereto. The magnet 186 is energized by current supplied by the mains 184, 184a, and by reason of the magnetic flux set up and flowing through the metal of the material as the latter moves relative to the magnet poles and in the magnetic field of the magnet, a current is induced in the magnet 187 and the leads 188 connected thereto. The leads 188 are connected to the winding of the relay 185, which winding being energized serves to hold the armature of the relay in switch-open position (see Fig. 62). As the slit or up-set portions B or slot B' passes between the magnet poles (see Fig. 63), the induced current in the leads 188 is reduced sufficiently to deenergize the relay winding, which releases the armature thereof and permits the latter to close the switch for the circuit 183, 183a. Upon the closing of the circuit 183, 183a, the winding of the solenoid is energized the effect of which is to operate the arm 178' and release the operating element 177. As the relay winding is deenergized momentarily, the arm 178 is operated and then released, which permits it to return to normal position under the influence of the spring 179 to engage the element 177 so that the shaft 171 makes but one revolution.

Where the material is up-set as shown at B or formed with a slot B' I may use a pawl the nose of which is arranged to ride on the surface of the shaped material (see Fig. 66), and to engage the rear edge of the up-set portions or slot (see Fig. 67), the effect of which is to swing the pawl and close a switch for the circuit for the winding of the solenoid 182. In this arrangement one main 184 is connected to the pawl 189 and the main 184a is connected to one end of the solenoid winding. The other end of the winding is connected by a lead 184b to an adjustable contact 190. The pawl 189 comprises a rocker 189' mounted on a shaft 191 and carrying a pivoted dog 192. The tail of the dog 192 is connected by a spring 193 to the rocker 189' and serves to normally hold the nose of the dog in engagement with the shaped material so that the nose will be engaged by the rear edge of the up-set portion or slot in the movement of the material, and when so engaged, the yieldable contact 194 on the tail member of the rocker 189' will engage the contact 190 and thus close the circuit for the winding of the solenoid 182. The dog 192 is provided with a stop 194' which is arranged to engage a lug 194a on the rocker 189' to limit the swinging movement of the dog 192 in opposition to the spring 193, so that the rear edge of the up-set portion or slot B' will be effective, through the dog, to operate the rocker 189'.

Referring to Figs. 69, 70 and 71, 300 indicates a lamp connected to the mains 184, 184a, and arranged at one side of the shaped material A so as to project a light beam or ray through each slot B' as the material moves relative to the lamp. 301 indicates generally a light sensitive controlling device of the type utilizing a photo-electric cell 302 and a grid glow tube 303 to operate a relay 304. The cell 302 is arranged at the opposite side of the shaped material A so as to be affected by the light beam or ray projected through each slot B'. The cell 302 is in circuit with the tube 303. Alternating current of relatively low voltage is supplied to the cell 302 and tube 303 by means of a transformer 305, the current for the transformer being supplied by leads 306, 307, from the mains 308, 309. When each slot B' moves past the lamp 300 and cell 302, a light beam strikes the latter which operates to energize the winding of the relay 304. The relay 304 will in turn close the circuit 310 for the solenoid 182. The solenoid will in turn operate through the arm 178', shaft 178a and arm 178 to release the clutch or operating element 177 in the manner already described.

From the foregoing description it will be seen that when each preliminary cut, up-set portion or slot passes a given point, the final severing mechanism is set in operation so that the final cut made by the saw 143 is in line with such preliminary severance.

Instead of slitting or up-setting the material A prior to the shaping operations by a pair of rotary mounted devices as shown in Figs. 1, 2, and 22, I may substitute therefor a reciprocating tool to shear the material or stamp an intermediate section therefrom to form a slot B', as shown in Figs. 60 and 61. Referring to Figs. 54 to 59, inclusive, 273 indicates a suitable base supporting standards 274 which are connected at their upper ends by a casting 274a. 275 indicates a bed over which the material A is fed from the rolls 2'—2'' to the rolls 4'—4'', the bed being formed with a transverse opening 276 for a purpose later set forth and slidable in ways 277 provided on a base or plate 273a. 278 indicates a tool holder having at its opposite ends shoes which are slidably mounted in suitable guides 279 provided on the bed 275. The holder 278 carries a knife or punch 280 and the walls of the opening 276 are shaped to co-act therewith according to the type of tool used. 281 indicates a shaft mounted in the standards 274 and drivingly connected, as later set forth to a gear 282, which is continuously driven by a gear 282a, fixed to the shaft of a motor 283. Intermediate the standards 274, the shaft 281 is provided with throws or eccentrics 284 which rotate in the journal of a connecting rod 284a (two spaced rods being preferably provided). The lower ends of the rods 284a are provided with knuckles 285 which aline with knuckles on the tool holder to receive a pin 285a to pivotally connect the rods and holder together. Accordingly, when the shaft 281 is rotated, the holder 278 will be operated downwardly and upwardly to effect operation of the tool. The shaft 281 is connected to the gear 282 by a suitable one-revolution clutch, mounted in a casing 286 having a controlling device 287 which is released and engaged by a trigger 288. The trigger 288 comprises a lever pivoted on the adjacent standard 274 and normally biased into operating position by a spring 288a adjustably fixed to the adjacent standard. The lever 288 is connected by a link 289 to one end of a lever 289a, the opposite end of which engages a cam 290. The cam 290 is fixed to a shaft 290a which is driven through an adjustable reduction gearing of suitable construction, mounted in a casing 291, such gearing being adjusted so as to co-ordinate the speed of the cam to the feed of the material A, whereby the tool will operate when predetermined lengths of the material feed relative thereto. The reduction gearing is driven by means of a chain engaging a sprocket fixed to the shaft of the motor 283. Upon operation of the cam 290, the trigger 288 will first release the controlling element 287 and then return to normal position in the path of movement of the element and through its engagement therewith release the clutch and disconnect the shaft 281 from the gear 282. To stop the shaft 281 when thus released, I provide on the opposite end thereof a suitable drag brake 292. In the downward movement of the tool 280 it engages the material and punches the slot B' therein. In such operation, the material is forced against the bed 275 with pressure sufficient enough to cause the latter to adhere to the material and move therewith in the ways 277 until the tool, in its receding or upward movement, disengages the material. To permit of this movement the bed 275 slides in the ways 277 against the tension of springs 293, which, upon the disengagement of the tool from the material, return the bed to normal position, against a stop 294. The springs 293 are adjustably connected to brackets 295 carried by the base 273.

By eliminating the preliminary severing means, using a cutter 143 of larger diameter and co-ordinating the movement of the cutter longitudinally and transversely of the material with the feed thereof, for example from one of the driven shafts for the rolls 133, the shaped material may be completely cut into predetermined lengths by the cutter 143.

To those skilled in the art to which my invention relates, many changes in construction and widely differing embodiments and applications of the invention will suggest themselves without departing from the scope thereof. The disclosures and description herein are purely illustrative and not intended to be in any sense limiting.

What I claim is:

1. In apparatus for shaping sheet material supplied continuously, the combination of means for feeding the material, means for severing the intermediate portion of the material on transverse lines spaced longitudinally thereof, sets of rolls for progressively shaping the material into a hollow body with its side edges in alined relation, and mechanism for severing the remaining portion of the material coincidently with the transverse severing lines.

2. In apparatus for shaping sheet material supplied continuously, the combination of means for feeding the material, means for severing the intermediate portion of the material on transverse lines spaced longitudinally thereof, sets of rolls for progressively shaping the material into a hollow body with its side edges in alined relation, and mechanism for severing the remaining portion of the material coincidently with the transverse severing lines, said mechanism being controlled by the feed of the shaped material.

3. In apparatus for shaping sheet material supplied continuously, the combination of means for feeding the material, means co-ordinated with the feeding of the material for severing the intermediate portion thereof on transverse lines uniformly spaced longitudinally of the material, sets of rolls for progressively shaping the material into a hollow body with its side edges in alined relation, and mechanism for severing the remaining portion of the material coincidently with the transverse severing lines, said mechanism being controlled by the feed of the shaped material.

4. In apparatus for shaping sheet material supplied continuously, the combination of means for feeding the material, means co-ordinated with the feeding of the material for severing the intermediate portion thereof on transverse lines uniformly spaced longitudinally of the material, sets of rolls for progressively shaping the material into a hollow body with its side edges in alined relation, and mechanism for severing the remaining portion of the material coincidently with the transverse severing lines, said mechanism being controlled by the lines of severance.

5. In apparatus for shaping sheet material supplied continuously, the combination of means for feeding the material, means for severing the intermediate portion of the material on transverse lines spaced longitudinally of the material, sets of rolls for progressively shaping the material into a hollow body with its side edges in alined relation, mechanism for severing the remaining portion of the material coincidently with the transverse severing lines, and means for controlling said mechanism, said means including a device arranged to be engaged and actuated by one wall of each line of severance.

6. In apparatus for shaping sheet material supplied continuously, the combination of means for feeding the material, means for severing the intermediate portion of the material on transverse lines spaced longitudinally thereof, sets of rolls for progressively shaping the material into a hollow body with its side edges in alined relation, and electrically operated mechanism for severing the remaining portion of the material coincidently with the transverse severing lines.

7. In apparatus for shaping sheet material supplied continuously, the combination of means for feeding the material, means for forming in the intermediate portion of the material transversely arranged slots spaced longitudinally thereof, sets of rolls for progressively shaping the material into a hollow body with its side edges in alined relation, mechanism for severing the remaining portion of the material coincidently with the transverse severing lines, and electrical means for controlling said mechanism, said electrical means including a photoelectric cell related to the slots in the body for transmitting rays therethrough to effect operation of said means.

8. In apparatus for shaping sheet material supplied continuously, the combination of means for feeding the material, means for severing the intermediate portion of the material on transverse lines spaced longitudinally thereof, sets of rolls for progressively shaping the material into a hollow body with its side edges in alined relation, means for welding the side edges of the material, and mechanism for severing the remaining portion of the material coincidently with the transverse lines of severance.

9. In apparatus for shaping sheet material supplied continuously, the combination of means for feeding the material, means for severing the intermediate portion of the material on transverse lines uniformly spaced longitudinally thereof, sets of rolls for progressively shaping the material into a hollow body with its side edges in alined relation, a cutter, a reciprocatable slide mounted to move in one direction with the shaped material, a support for the cutter movably mounted on the slide, and means for controlling the movements of the slide and support in relation to the lines of severance to move the cutter into engagement with the body to sever the remaining portion of the material coincidently with the lines of severance.

10. In apparatus for shaping sheet material supplied continuously, the combination of means for feeding the material, means for severing the intermediate portion of the material on transverse lines uniformly spaced longitudinally thereof, sets of rolls for progressively shaping the material into a hollow body with its side edges in alined relation, a cutter, a reciprocatable slide mounted to move in one direction with the shaped material, a support movably mounted on the slide, a motor on said support for driving said cutter, and means for controlling the movements of the slide and support in relation to the lines of severance to move the cutter into engagement with the body to sever the remaining portion of the material co-incidently with the lines of severance.

11. In apparatus for shaping sheet material supplied continuously, the combination of means for feeding the material, means for severing a portion of the material on transverse lines spaced longitudinally of the material, sets of rolls for progressively shaping the material into hollow form with its side edges in alined relation, and mechanism for severing the remaining portion of the material coincidently with the transverse severed lines.

12. In apparatus for shaping material supplied continuously, the combination of means for feeding the material, means for up-setting the intermediate portion of the material on transverse lines spaced longitudinally thereof, means for rolling down the up-set portions into the plane of the material, sets of rolls for progressively shaping the material into a hollow body with its side edges in alined relation, and mechanism for severing the remaining portion of the material coincidently with the transverse up-set lines.

13. In apparatus for shaping sheet material into hollow form, the combination of main sets of bending rolls arranged to engage lateral increments of the material progressively inwardly from its opposite side edges to bend each on a substantially predetermined radius less than that of the finished form, sets of intermediate rolls arranged to engage the previously curved increments, respectively, and re-shape them to the radius of the finished form, and a set of rolls for bending the central portion of the material to the radius of the completed form.

14. In apparatus for shaping sheet material into hollow form, the combination of main sets of bending rolls arranged to engage lateral increments of the material progressively inwardly from its opposite side edges to bend each on a substantially predetermined radius less than that of the finished form, sets of intermediate rolls arranged to engage the previously curved increments, respectively, and re-shape them to the radius of the finished form, certain of said intermediate sets of rolls being arranged to partially curve adjacent inward increments of the material, and a set of rolls for bending the central portion of the material to the radius of the completed form.

15. In apparatus for shaping sheet material into hollow form, the combination of main sets of bending rolls arranged to engage lateral increments of the material progressively inwardly from its opposite side edges to bend each on a substantially predetermined radius less than that of the finished form, sets of intermediate rolls arranged to simultaneously engage the previously curved increments, respectively, and re-shape them to the radius of the finished form and partially curve adjacent inward increments of the material, and a set of rolls for bending the central portion of the material to the radius of the completed form.

16. In apparatus for shaping sheet material into hollow form, the combination of means for feeding the material, main sets of bending rolls arranged to engage increments of the material progressively inwardly from its opposite side edges to bend them on predetermined radii less than that of the finished form, a set of intermediate rolls arranged between certain of said main sets of rolls for re-shaping the previously curved increments to the radius of the finished form, an intermediate set of rolls arranged between other main sets of rolls for working the material adjacent its marginal portions, and a set of rolls for bending the central portion of the material to the radius of the completed form.

17. In apparatus for shaping sheet material into hollow form, the combination of means for feeding the material, main sets of bending rolls arranged to engage increments of the material progressively inwardly from its opposite side edges to bend them on predetermined radii less than that of the finished form, a set of intermediate rolls arranged between certain of said main sets of rolls for re-shaping the previously curved increments to the radius of the finished form, an intermediate set of rolls arranged between other main sets of rolls for reversely bending the curved increments of the material adjacent its marginal portions, and a set of rolls for bending the central portion of the material to the radius of the completed form.

18. In apparatus for shaping sheet material into hollow form, the combination of means for feeding the material, main sets of bending rolls arranged to engage increments of the material progressively inwardly from its opposite side edges to bend them on predetermined radii, an intermediate set of rolls arranged between certain of the main sets of rolls for working the previously curved increments of the material adjacent its marginal portions, and a set of rolls for bending the central portion of the material to a predetermined radius.

19. In apparatus for shaping sheet material into hollow form, the combination of means for feeding the material, main sets of bending rolls arranged to engage increments of the material progressively inwardly from its opposite side edges to bend them on predetermined radii, means between certain of the main sets of rolls for partially bending previously curved increments in advance of the succeeding main sets of rolls, an intermediate set of rolls arranged between certain of the main sets of rolls for working the previously curved increments of the material adjacent its marginal portions, and a set of rolls for bending the central portion of the material to a predetermined radius.

20. In apparatus for shaping sheet material of indefinite length into hollow form, the combination of means for feeding the material, means for severing a portion of the material transversely at spaced points longitudinally thereof, main sets of bending rolls arranged to engage increments of the material progressively inwardly from its opposite side edges to bend them on predetermined radii, an intermediate set of rolls arranged between certain of the main sets of rolls for working the previously curved increments of the material adjacent its marginal portions, a set of rolls for bending the central portion of the material to a predetermined radius, and means for severing the remaining portion of the material at points coincident with the previously severed portions.

21. In apparatus for shaping sheet material of indefinite length into hollow form, the combination of means for feeding the material, means for severing the central portion of the material transversely at spaced points longitudinally thereof, main sets of bending rolls arranged to engage increments of the material progressively inwardly from its opposite side edges to bend them on predetermined radii, an intermediate set of rolls arranged between certain of the main sets of rolls for working the previously curved increments of the material adjacent its marginal portions, a set of rolls for bending the central portion of the material to a predetermined radius, means for welding the longitudinal side edges of the form, and means for severing the remaining portion of the material at points coincident with the previously severed portions.

22. In apparatus for shaping sheet material of indefinite length into hollow form, the combination of means for feeding the material, means for severing the central portion of the material transversely at spaced points longitudinally thereof, main sets of bending rolls arranged to engage increments of the material progressively inwardly from its opposite side edges to bend them on predetermined radii, an intermediate set of rolls arranged between certain of the main sets of rolls for working the previously curved increments of the material adjacent its marginal portions, a set of rolls for bending the central portion of the material to a predetermined radius, means for welding the longitudinal side edges of the form, means for severing the remaining portion of the material at points coincident with the previously severed portions, and a set of sizing rolls between the welding means and the last mentioned severing means.

23. In apparatus for shaping sheet material into hollow form, the combination of means for feeding the material, sets of bending rolls arranged to engage lateral increments of the material progressively inwardly from its opposite side edges to bend them on longitudinal lines beyond the elastic limit of the material, means between said sets of rolls for re-shaping the previously bent increments of the material to a predetermined radius, and a set of rolls for bending the central portion of the material to the predetermined radius.

24. In apparatus for shaping sheet material into hollow form, the combination of means for feeding the material, sets of bending rolls arranged to engage lateral increments of the material progressively inwardly from its opposite side edges to bend them on longitudinal lines beyond the elastic limit of the material, means between the sets of rolls for re-shaping the previously bent increments of the material to a predetermined radius, a set of rolls for bending the central portion of the material to the predetermined radius, and means for welding the longitudinal side edges of the shaped form.

25. In apparatus for shaping sheet material into hollow form, the combination of means for feeding the material, sets of bending rolls arranged to engage increments of the material progressively inwardly from its opposite side edges to bend them on longitudinal lines beyond the elastic limit of the material, means between certain of the sets of rolls for re-shaping the previously bent increments of the material to a predetermined radius, means between other of said sets of rolls for bending the previously bent marginal portions of the material on transverse lines beyond the elastic limit of the material, and a set of rolls for bending the central portion of the material to the predetermined radius.

26. In apparatus for shaping sheet material into hollow form, the combination of means for feeding the material, sets of bending rolls arranged to engage increments of the material progressively inwardly from its opposite side edges to bend them on longitudinal lines beyond the elastic limit of the material, means between certain of the sets of rolls for re-shaping the previously bent increments of the material to a predetermined radius, means between other of said sets of rolls for bending the previously bent marginal portions of the material on transverse lines beyond its elastic limit, a set of rolls for bending the central portion of the material to the predetermined radius, a welding mechanism, and means for guiding the side edges of the shaped material to said mechanism.

27. The herein disclosed process of forming hollow bodies from sheet material of indefinite length which consists in feeding the material, progressively curving increments of the material from its opposite side edges inwardly on radii less than the finished form, progressively re-shaping previously curved increments to the radius of the finished form and simultaneously curving adjacent increments, finally, curving the central portion of the material and then cutting the material into predetermined lengths during movement thereof.

28. The herein disclosed process of forming hollow bodies from sheet material of indefinite length which consists in feeding the material, severing portions of the material on transverse lines, then in progressively curving increments of the material from its opposite side edges inwardly, curving the central portion of the material and finally cutting the remaining portion of the material during movement thereof coincidently with the transverse lines of severance.

29. The herein disclosed process of forming hollow bodies from sheet material of indefinite length which consists in feeding the material, severing portions of the material on transverse lines, progressively curving increments of the material from its opposite side edges inwardly, curving the central portion of the material, welding the longitudinal edges of the material and finally cutting the remaining portion of the material during movement thereof coincidently with the transverse lines of severance.

30. The herein disclosed process of forming hollow bodies from sheet material which consists in feeding the material, severing the intermediate portion of the material on transverse lines, progressively curving increments of the material from its opposite side edges inwardly, re-shaping the curved increments to a predetermined radius and curving the central portion of the material to the predetermined radius and finally cutting the remaining portion of the material during movement thereof coincidently with the transverse lines of severance.

31. The herein disclosed process of forming hollow bodies from sheet material which consists in feeding the material, progressively curving increments of the material from its opposite side edges inwardly, working the curved increments of the material on transverse lines adjacent its marginal portions, and finally curving the central portion of the material.

32. The herein disclosed process of forming hollow bodies from sheet material which consists in feeding the material and first progressively curving lateral increments of the material from its opposite side edges inwardly, then in working the curved increments of the material on transverse lines adjacent its marginal portions and curving the central portion of the material, and finally welding the longitudinal edges of the material.

33. The herein disclosed process of forming hollow bodies from sheet material which consists in feeding the material, then in bending the outer lateral increments of the material beyond its elastic limit, then in bending adjacent increments by successive passes beyond the elastic limit of the material and re-shaping the bent increments to a predetermined radius and finally in bending the central portion of the material to the predetermined radius.

34. The herein disclosed process of forming hollow bodies from sheet material which consists in feeding the material, then in bending the outer lateral increments of the material on longitudinal lines beyond its elastic limit, then in bending adjacent increments on longitudinal lines by successive passes beyond the elastic limit of the material and re-shaping the bent increments to a predetermined radius, then in bending the bent increments of the material adjacent its marginal portions on transverse lines beyond its elastic limit and re-shaping such increments to the predetermined radius and finally bending the central portion of the material to the predetermined radius.

35. The herein disclosed process of forming hollow bodies from sheet material which consists in feeding the material, then in bending the outer lateral increments of the material on longitudinal lines beyond its elastic limit, then in bending adjacent increments on longitudinal lines by successive passes beyond the elastic limit of the material and re-shaping the bent increments to a predetermined radius, then in bending the bent increments of the material adjacent its marginal portions on transverse lines beyond its elastic limit and re-shaping such increments to the predetermined radius and finally bending the central portion of the material to the predetermined radius and welding the side edges of the material.

36. In apparatus of the class described, the combination of main sets of rolls for bending progressively inwardly from the opposite side edges of the material increments thereof to a radius less than that of the finished form, pairs of devices between certain of said sets of rolls for preliminarily bending adjacent increments in advance of the succeeding roll set and re-shaping the previously bent increments to the radius of the finished form, and means for bending the central portion of the material to the radius of the finished form.

37. In apparatus for shaping sheet material into hollow form, the combination of main sets of bending rolls arranged to engage increments of the material progressively inwardly from its opposite side edges to bend them on predetermined radii less than that of the finished form, means arranged to engage the previously curved increments for re-shaping them to the radius of the finished form and for partially curving adjacent inward increments of the material, and a set of rolls for bending the central portion of the material to the radius of the completed form.

38. In apparatus for shaping sheet material supplied continuously, the combination of means for feeding the material, means for forming in the intermediate portion of the material openings spaced longitudinally thereof, sets of rolls for progressively shaping the material into a hollow body with its side edges in alined relation, mechanism for severing the remaining portion of the material coincidently with said openings and electrical means for controlling said mechanism, said electrical means including a photoelectric cell related to the openings in the body for transmitting rays therethrough to effect operation of said means.

39. In the herein disclosed process of shaping sheet metal into hollow bodies which consists in feeding the material and subjecting it to succeeding shaping passes, to curve the material into hollow form, severing an intermediate portion of the material prior to the shaping of such portion on transverse lines, and finally cutting the unsevered portions of the shaped form substantially co-incidently with the transverse lines of severance.

40. The herein disclosed process of shaping sheet metal into hollow bodies which consists in feeding the material and subjecting it to succeeding shaping passes to shape the material into hollow form and a severing means to sever on transverse lines the intermediate portion of the material, and finally severing the unsevered portions of the shaped form substantially co-incidently with the transverse lines of severance.

41. In the herein disclosed process of shaping sheet metal into hollow bodies which consists in feeding the material and subjecting it to succeeding shaping passes to curve the material into hollow form, severing an intermediate portion of the material prior to the shaping of such portion on transverse lines, subjecting previously curved portions of the material to passes to bend such portions on transverse lines, and finally cutting the unsevered portions of the shaped form substantially co-incidently with the transverse lines of severance.

42. A method of manufacturing pipe by continuous welding methods, including producing laterally slotted skelp having continuous side edge portions, shaping and welding said skelp so as to effect a continuous production of circumferentially slotted pipe and then cutting the portions of said pipe circumferentially separating its slots.

CARL MINTER YODER.